United States Patent
Divelbiss et al.

(10) Patent No.: US 7,180,554 B2
(45) Date of Patent: Feb. 20, 2007

(54) PROJECTION SYSTEM FOR STEREOSCOPIC DISPLAY DIGITAL MICRO-MIRROR DEVICE

(75) Inventors: Adam Divelbiss, Wappingers Falls, NY (US); David Swift, Cortlandt Manor, NY (US)

(73) Assignee: VREX, Inc., Elmsford, NY (US)

( * ) Notice: Subject to any disclaimer, the term of this patent is extended or adjusted under 35 U.S.C. 154(b) by 0 days.

(21) Appl. No.: 10/045,901

(22) Filed: Jan. 14, 2002

(65) Prior Publication Data

US 2003/0112507 A1 Jun. 19, 2003

Related U.S. Application Data

(60) Provisional application No. 60/261,136, filed on Jan. 12, 2001, provisional application No. 60/239,664, filed on Oct. 12, 2000.

(51) Int. Cl.
 H04N 9/12 (2006.01)
 G09G 5/00 (2006.01)
(52) U.S. Cl. .......................... 348/742; 348/743; 345/6; 359/465
(58) Field of Classification Search ................ 345/419, 345/547, 574, 6; 348/42, 43, 45, 743, 786, 348/715, 718, 742; 359/223, 462, 464, 290; 358/428; 395/128
 See application file for complete search history.

(56) References Cited

U.S. PATENT DOCUMENTS 5,226,114 A * 7/1993 Martinez et al. ............ 358/428
5,528,317 A * 6/1996 Gove et al. ................. 348/743
5,585,960 A * 12/1996 Sato et al. ................... 359/290
5,706,061 A * 1/1998 Marshall et al. ............ 348/743
6,002,452 A * 12/1999 Morgan ...................... 348/742
6,208,318 B1 3/2001 Spiegl
6,329,963 B1 * 12/2001 Chiabrera et al. ............. 345/6
6,414,708 B1 * 7/2002 Carmeli et al. ............... 348/42
6,456,432 B1 * 9/2002 Lazzaro et al. ............. 359/464

FOREIGN PATENT DOCUMENTS

| AU | 674 619 B | 1/1997 |
| JP | 10 153755 A | 9/1998 |
| JP | 11 160649 A | 9/1999 |
| WO | 02 32149 A | 4/2002 |

OTHER PUBLICATIONS

ISR PCT/US01/32087 mailed Apr. 25, 2002.
ISR PCT/US02/01314 mailed Jun. 18, 2002.

\* cited by examiner

*Primary Examiner*—Audrey Chang

(57) ABSTRACT

A digital micro-mirror device (DMD) format conversion system for outputting a stereoscopic encoded optical signal using a DMD and a color wheel is provided. The DMD format conversion system includes a 3D data formatter for receiving an input signal and a DMD data formatter for receiving an output signal having stereoscopic image information and control information from the 3D data formatter and for outputting a DMD output signal having stereoscopic image information and control information. A color wheel control signal and output digital micro-mirror device data are synchronized based on an output frame rate generated by the 3D data formatter independent of the original input frame rate.

9 Claims, 34 Drawing Sheets

Signal Flow and Optics Block Diagram for DMD Based 3D Projection System

Single-Chip DMD Projection System – Example 1

Single-Chip DMD Projection System – Example 2

Three-Segment Color Wheel for Single Chip DMD Projection Systems

Four-Segment Color Wheel for Single Chip DMD Projection Systems

2D DMD Projector Video Processing Block Diagram for Single-Chip DLP Projector

Signal Flow and Optics Block Diagram for DMD Based 3D Projection System

3D Data Formatter Block Diagram

DMD Data Formatter Block Diagram

DMD Data Formatter Chart for Input Synchronized Frame Sequential 3D Input Using Four-Segment Color Wheel (Chart applies to 75Hz, 80Hz, and 85Hz input signals)

DMD Data Formatter Chart for Input Synchronized Frame Sequential 3D Input Using Three-Segment Color Wheel (Chart applies to 72Hz, 75Hz, and 80Hz input signals)

Input Synchronized Color Sequential 3D Using a Three Segment Color Wheel and Quad Frame Buffer
(Chart applies to 72Hz, 75Hz, and 80Hz input signals)

Input Synchronized Color Sequential 3D Using a Six-Segment Color Wheel and Quad Frame Buffer
(Chart applies to 72Hz, 75Hz, and 80Hz input signals)

DMD Formatter Chart for Output Synchronized Frame Sequential 3D Format for 60Hz Input Using a Four-Segment Color Wheel DMD Formatter Chart for Output Synchronized Frame Sequential 3D Format for 120Hz Input Using a Four-Segment Color Wheel DMD Formatter Chart for Output Synchronized Frame-Sequential 3D Format for 60Hz Over-Under 3D Input using a Four-Segment Color Wheel DMD Formatter Chart for Output Synchronized Color Sequential 3D Format for 120Hz Color-Sequential 3D Input, Using a Three-Segment Color Wheel Cholosteric Liquid Crystal Reflective Circular Polarizing Red Filter
(Similar for White, Green, or Blue)

Spectral Response for CLC IR Filter/Circular Polarizer

Three-Segment Color Wheel Type CW-A

Three-Segment Color Wheel Type CW-B

Six-Segment Color Wheel Type CW-C

Six-Segment Color Wheel Type CW-D

Six-Segment Color Wheel Type CW-E

Four-Segment Color Wheel Type CW-F

Four-Segment Color Wheel Type CW-G

Eight-Segment Color Wheel Type CW-H

Eight-Segment Color Wheel Type CW-I

Eight-Segment Color Wheel Type CW-J

3600

Liquid Crystal Rotator with no Applied Terminal Voltage

3700

Liquid Crystal Rotator with Applied Terminal Voltage

DMD Based Stereo 3D Projector, 3D Optical Configurations: A, B, H, I, K, M, N, S, U, W DMD Based Stereo 3D Projector, 3D Optical Configurations: C and O DMD Based Stereo 3D Projector, 3D Optical Configurations: D and P DMD Based Stereo 3D Projector, 3D Optical Configurations: E and Q DMD Based Stereo 3D Projector, 3D Optical Configurations: F, G, J, L, R, T, and V 3D Data Formatter Block Diagram Switch A Control for Row-Interleaved RGB Input Output Scaling for Row-Interleaved 3D Format Input Switch A Control for "Over-Under" RGB 3D Format Output Scaling for Over-Under 3D Format Input Switch A Control for "Page-Flipped" 3D Input Output Scaling for "Page-Flipped" 3D Format Input Switch A Control for "Side-by-Side" RGB 3D Input Output Image Scaling for Side-by-Side 3D Format Input Switch B Control for 3D Data Formatter Block Graphical Illustration of 3D Data Formatter Output 3D Display Formatter Block Diagram for 3D Display Processor Using Column Blanking Method

PROJECTION SYSTEM FOR STEREOSCOPIC DISPLAY DIGITAL MICRO-MIRROR DEVICE

CROSS REFERENCE TO RELATED APPLICATIONS

The present application is related to a Provisional Application Ser. No. 60/239,664 filed on Oct. 12, 2000 entitled DLP Based 3D Projection System, to an International Application number PCT/US01/32087 filed on Oct. 12, 2001 entitled Digital Light Processing Based 3D Projection System and Method and to another Provisional Application Ser. No. 60/261,136 filed on Jan. 12, 2001 entitled Method and apparatus for stereoscopic display using digital light processing. All of these references are incorporated herein by this reference.

BACKGROUND OF THE INVENTION

Digital light processing (DLP)® technology from Texas Instruments Inc. has been proven to be a viable and reliable technology for use in data and multimedia image projection systems. The basis of the DLP technology is the Digital Micro-mirror Device (DMD) from Texas Instruments as described in U.S. Pat. No. 5,061,049 by Hornbeck issued on Oct. 29, 1991 and incorporated herein by reference. The DMD chip is a micro electromechanical system (MEMS) consisting of an array of bistable mirrors fabricated over a CMOS memory substrate. Projection systems based on this technology vary in configuration and include one-chip, two-chip, and three-chip DMD designs. Special properties of the DMD chip and the method by which light is modulated by the mirrors afford the possibility of developing a 3D stereoscopic projection system based on the DMD technology. A 3D stereoscopic projection system has the ability to deliver left and right eye views of an image to multiple people thus creating the illusion of depth for groups of people. The DLP based 3D stereoscopic projection system described here provides many benefits including low crosstalk between left-eye right-eye information, high brightness, low flicker, and compactness.

Single Chip DMD Projection Systems

Single-chip projector systems utilize a single DMD (digital micro-mirror device) chip and a color wheel to display full color images. The DMD chip reflects light passing through the color wheel either through the projection lens system onto a projection screen or back through the color wheel into the light source. Since the DMD chip consists of thousands of tiny micro-electromechanical mirrors, the chip itself does not regulate color. For this reason a color wheel that consists of at least three primary colors (e.g., red, green, and blue) is used to modulate the light source color. The color is modulated at a rate faster than is discernable by the human eye, thereby causing a full color effect. The intensity of the light that is reflected by each pixel (micro-mirror) of the DMD chip is control by a pulse-width modulation scheme. This scheme is more fully described in "Pulse Width Modulation Control in DLP Projectors," 115–121 TI Technical Journal, July–September 1998, by Don Doherty and Greg Hewlett and hereby incorporated by reference. The DMD chip consists of a complicated micro-mechanical mirror system constructed over a CMOS memory substrate. The DMD chip is described in "Digital light Processing for High Brightness, High Resolution Applications", pg. 4 by Larry J. Hornbeck from Texas Instrument website, www.ti-.com/dlp white paper section and hereby incorporated by reference. To display a single image frame from a video or computer source on the DMD chip, mirror state information is written to the CMOS substrate of the DMD chip in blocks or groups. Once a block of memory is written, each mirror above the block is updated to its new state. This process continues block by block until each mirror in the chip is updated. At the end of the frame, all mirrors on the chip are reset to the "OFF" position at the same time. That is, each mirror is directed to reflect light back into the optical source. The fact that all mirrors on the DMD chip are reset to "OFF" at the end of a chip update makes the DMD chip eminently suitable as a light valve for 3D stereoscopic projection systems as explained below.

The Mirror as a Switch

The DMD light switch 100 as illustrated in FIG. 1) is a member of a class of devices known as microelectromechanical systems (MEMS). Other MEMS devices include pressure sensors, accelerometers, and micoractuators. The DMD is monolithically fabricated by CMOS-like processes over a CMOS memory. Each light switch has an aluminum mirror, 16 μm square 102 that can reflect light in one of two directions, depending on the state of the underlying memory cell. Rotation of the mirror is accomplished through electrostatic attraction produced by voltage differences developed between the mirror and the underlying memory cell. With the memory cell in the on (1) state, the mirror rotates to +10 degrees. With the memory cell in the off (0) state, the mirror rotates to −10 degrees.

By combining the DMD 202 with a suitable light source (not shown) and projection optics 204 (FIG. 2), the mirror reflects incident light either into or out of the pupil of the projection lens by a simple beam-steering technique. Thus, the (1) state of the mirror appears bright and the (0) state of the mirror appears dark. Compared to diffraction-based light switches, the beam-steering action of the DMD light switch provides a superior tradeoff between contrast ratio and the overall brightness efficiency of the system.

Grayscale and Color Operation

Grayscale is achieved by binary pulse width modulation of the incident light. Color is achieved by using color filters; either stationary or rotating, in combination with one, two, or three DMD chips The DMD light switch is able to turn light on and off rapidly by the beam-steering action of the mirror. As the mirror rotates, it either reflects light into or out of the pupil of the projection lens, to create a burst of digital light pulses that the eye interprets as an analog image. The optical switching time for the DMD light switch is ~2 microseconds. The mechanical switching time, including the time for the mirror to settle and latch, is ~15 μs.

The technique for producing the sensation of grayscale to the observer's eye is called binary pulse width modulation. The DMD accepts electrical words representing gray levels of brightness at its input and outputs optical words, which are interpreted by the eye of the observer as analog brightness levels.

The details of the binary pulse width modulation (PWM) technique are illustrated in FIG. 3. For simplicity, the PWM technique is illustrated for a 4-bit word ($2^4$ or 16 gray levels) 300. Each bit in the word represents time duration for light to be on or off (1 or 0). The time durations have relative values of $2^0$, $2^1$, $2^2$, $2^3$ or 1, 2, 4, 8. The shortest interval (1) is called the least significant bit (LSB). The longest interval (8) is called the most significant bit (MSB). The video field time is divided into four time durations of 1/15, 2/15, 4/15, and 8/15 of the video field time. The possible gray levels produced by all combinations of bits in the 4-bit word are $2^4$ or 16 equally spaced gray levels (0, 1/15, 2/15 ... 15/15). Current DLP systems are either 24-bit color (8 bits or 256 gray levels per primary color) or 30-bit color (10 bits or 1024 gray levels per primary color).

In the simple example shown in FIG. 3, spatial and temporal artifacts can be produced because of imperfect integration of the pulsed light by the viewer's eye. These artifacts can be reduced to negligible levels by a "bit-splitting" technique. In this technique, the longer duration bits are subdivided into shorter durations, and these split bits are distributed throughout the video field time. SLP displays combine pulse width modulation and bit-splitting to produce a "true-analog" sensation, but with greater accuracy and stability than can be achieved by analog projection systems.

DMD Cell Architecture and Fabrication

The DMD pixel 400 is a monolithically integrated MEMS super-structure cell fabricated over a CMOS SRAM 402 cell as illustrated in FIG. 4. An organic sacrificial layer is removed by plasma etching to produce air gaps between the metal layers 404 of the superstructure. The air gaps free the structure to rotate about two compliant torsion hinges 406. The mirror 408 is rigidly connected to an underlying yoke 410. Two thin, mechanically compliant torsion hinges to support posts that are attached to the underlying substrate, in turn, connect the yoke.

The address electrodes 412 for the mirror and yoke are connected to the complementary sides of the underlying SRAM cell. The yoke and mirror are connected to a bias bus fabricated at the metal-3 layer. The bias bus 414 interconnects the yoke and mirrors of each pixel to a bond pad at the chip perimeter. An off-chip driver supplies the bias waveform necessary for proper digital operation (Section 2.4). The DMD mirrors are 16 µm square and made of aluminum for maximum reflectivity. They are arrayed on 17 µm centers to form a matrix having a high fill factor (~90%). The high fill factor produces high efficiency for light use at the pixel level and a seamless (pixelation-free) projected image.

Electrostatic fields are developed between the mirror and its address electrode and the yoke and its address electrode, creating an efficient electrostatic torque. This torque works against the restoring torque of the hinges to produce mirror and yoke rotation in the positive or negative direction. The mirror and yoke rotate until the yoke comes to rest (or lands) against mechanical stops that are at the same potential as the yoke. Because geometry determines the rotation angle, as opposed to a balance of electrostatic torques employed in earlier analog devices, the rotation angle is precisely determined.

The fabrication of the DMD superstructure begins with a completed CMOS memory circuit. A thick oxide is deposited over metal-2 of the CMOS and then planarized using a chemical mechanical polish (CMP) technique. The CMP step provides a completely flat substrate for DMD superstructure fabrication, ensuring that the projector's brightness uniformity and contrast ratio are not degraded.

Through the use of six photo mask layers, the superstructure is formed with layers of aluminum for the address electrode (metal-3), hinge, yoke and mirror layers and hardened photoresist for the sacrificial layers (spacer-1 and spacer-2) that form the two air gaps. The aluminum is sputter-deposited and plasma-etched using plasma-deposited $SiO_2$ as the etch mask. Later in the packaging flow, the sacrificial layers are plasma-ashed to form the air gaps.

The packaging flow begins with the wafers partially sawed along the chip scribe lines to a depth that will allow the chips to be easily broken apart later. The partially sawed and cleaned wafers then proceed to a plasma etcher that is used to selectively strip the organic sacrificial layers from under the DMD mirror, yoke, and hinges. Following this process, a thin lubrication layer is deposited to prevent the landing tips of the yoke from adhering to the landing pads during operation. Before separating the chips from one another, each chip is tested for full electrical and optical functionality by a high-speed automated wafer tester. Finally, the chips are separated from the wafer, plasma-cleaned, relubricated, and hermetically sealed in a package.

The DMD chips are packaged in two array sizes, SVGA (800×600) and SXGA (1280×1024). The diagonals of the active area are 0.7 in. (SVGA) and 1.1 in. (SXGA).

Electronic Operation

The DMD pixel is inherently a digital device because of the way it is electronically driven. It is operated in an electrostatically bistable mode by the application of a bias voltage to the mirror to minimize the address voltage requirements. Thus, large rotation angles can be achieved with a conventional 5-volt CMOS address circuit.

The organization of the DMD chip is illustrated in FIG. 5. Underlying each DMD mirror and mechanical superstructure cell is a six-transistor SRAM. Multiple data inputs and demultiplexers (1:16) are provided to match the frequency capability of the on-chip CMOS with the required video data rates. The pulse width modulation scheme for the DMD requires that the video field time be divided into binary time intervals or bit times. During each bit time, while the mirrors of the array are modulating light, the underlying memory array is refreshed or updated for the next bit time. Once the memory array has been updated, all the mirrors in the array are released simultaneously and allowed to move to their new address states.

This simultaneous update of all mirrors, when coupled with the PWM bit-splitting algorithm described above, produces an inherently low-flicker display. Flicker is the visual artifact that can be produced in CRTs as a result of brightness decay with time of the phosphor.

Because CRTs are refreshed in an interlaced scan-line format, there is both a line-to-line temporal phase shift in brightness as well as an overall decay in brightness. DLP-based displays have inherently low flicker because all pixels are updated at the same time (there is no line-to-line temporal phase shift) and because the PWM bit-splitting algorithm produces short-duration light pulses that are uniformly distributed throughout the video field time (no temporal decay in brightness).

Proper operation of the DMD is achieved by using the bias and address sequence illustrated in FIG. 6 and detailed in Table 1.

The bias voltage has three functions. First, it produces a bistable condition to minimize the address voltage requirement, as previously mentioned. In this manner, large rotation angles can be achieved with conventional 5-volt CMOS. Second, it electromechanically latches the mirrors so that they cannot respond to changes in the address voltage until the mirrors are reset. The third function of the bias is to reset the pixels so that they can reliably break free of surface adhesive forces and begin to rotate to their new address states.

Although the metal surfaces of the superstructure are coated with a passivation layer or lubrication layers, the remaining van der Waal or surface forces between molecules require more than the hinge-restoring force to reliably reset the mirrors. A reset voltage pulse applied to the mirror and yoke causes the spring tips of the yoke to flex. As the spring tips unflex, they produce a reaction force that causes the yoke landing tips to accelerate away from the landing pads, producing a reliable release from the surface 1 Table 1. DMD Address and Reset Sequence
  1. Memory ready 602—All memory cells under the DMD have been loaded with the new address states for the mirrors.
  2. Reset 604—All mirrors are reset in parallel (voltage pulse applied to bias bus).
  3. Unlatch 606—The bias is turned off to unlatch mirrors and allow them to release and begin to rotate to flat state.
  4. Differentiate 608—Retarding fields are applied to the yoke and mirrors in order to rotationally separate the mirrors that remain in the same state from those that are to cross over to a new state.
  5. Land and latch 610—The bias is turned on to capture the rotationally separated mirrors and enable them to rotate to the addressed states, then settle and latch.
  6. Update memory array 612 (one line at a time)—The bias remains turned on to keep the mirrors latched so as to prevent them from responding to changes in the memory, while the memory is written with new video data.
  7. Repeat sequence beginning at step 1.

DMD Structure

As discussed above each DMD consists of thousands of tilting, microscopic, aluminum alloy mirrors. These mirrors are mounted on a hidden yoke. A torsion-hinge structure connects the yoke to support posts. The torsion hinges permit mirror rotation of +10 degrees. The support posts are connected to an underlying bias/reset bus. The bias/reset bus is connected so that both the bias and reset voltage can be supplied to each mirror. The mirror, hinge structure, and support posts are all formed over an underlying complementary metal oxide semiconductor (CMOS) address circuit and a pair of address electrodes Applying voltage to one of the address electrodes in conjunction with a bias/reset voltage to the mirror structure creates an electrostatic attraction between the mirror and the addressed side. The mirror tilts until it touches the landing electrode that is held at the same potential. At this point, the mirror is electromechanically latched in place. Placing a binary one in the memory cell causes the mirror to tilt +10 degrees, while a zero causes the mirror to tilt −10 degrees.

DMDs have been built in arrays as large as 2048×1152, yielding roughly 2.3 million mirrors per device. These devices have the capability of showing true high-definition television. The first mass-produced DMD will be an 848× 600 device. This DMD will be capable of projecting NTSC, phase alternating line (PAL), VGA, and super video graphics adapter (SVGA) graphics, and it will also be capable of displaying 16:9 aspect ratio sources. The video processing for a micromirror display system is more fully described in a "White Paper" entitled "Video processing for DLP™ Display System" by Vishal Markandey, Todd Clatnoff and Greg Pettitt available on the Texas Instruments web page (http://www.dlp.com/dlp/resources/whitepapers/pdf/vproc.pdf), hereby incorporated in full by reference.

Single-Chip DMD Projection System—Example 1

FIG. 7 illustrates a typical single chip DMD projector optical design 700 by Texas Instruments as described in "From Cathode Rays To Digital Micromirrors: A History of Electronic Projection Display Technology", Larry J. Hornbeck, pg. 40, TI Technical Journal, July–September 1998 and hereby incorporated by reference. In this design an elliptic mirror and condenser lens 702 projects light through the color wheel 604 and into an integrator rod 706. A second condensing lens system 108 gathers light exiting from the integrator rod 706. Two reflecting prisms 710 and 712 are used to reflect this light onto the DMD chip 714 that, in turn, reflects light out through the projection optics 716 and onto a view screen (not shown).

Single-Chip DMD Projection System—Example 2

FIG. 8 illustrates an alternative DMD projector configuration 200 used by Plus Corporation. This design is simpler in that it does not utilize reflecting prisms. In this design light passes from an elliptic mirror through a color wheel 204 and is collected by a condensing lens system. The light is then reflected from a fixed mirror 208 up to the DMD chip 210, from whence it is reflected out through the projection optics 212 as dictated by the image being displayed.

The designs represented by FIG. 8 and FIG. 9 are not the only possible ways in which a single chip DLP projection system can be configured. These figures are included for illustrative purposes only and do not in any way limit the applicability of this invention to other single chip DLP configurations using a single DMD chip and a color wheel.

Three-Segment Color Wheel for Single Chip DMD Projection Systems

FIG. 9 illustrates a three-segment color wheel configuration 900 for a single chip DLP projection system. This wheel design consists of a wheel hub 902 and a translucent region consisting of three separate color filters, red 904, green 906, and blue 908. DLP projection systems utilizing the three-color color wheel split each image into three separate color components that are displayed sequentially in time and that correspond to the color filters on the wheel. In the case of a 60 Hz video source input to the projector, the image is split into its red, green, and blue components and displayed at a rate of 180 Hz.

Four-Segment Color Wheel for Single Chip DMD Projection Systems

FIG. 10 illustrates a four-segment color wheel configuration 1000 for single chip DLP projection systems. This wheel design enables the projector to display brighter white images by adding a clear filter 1002 to the color wheel 1004 in addition to the red 1006, green 1008, and blue 1010 color filters. In this configuration, each primary color (red, green, and blue) subtends the same angle while the white section subtends a slightly smaller angle than the color filters.

DMD Projector Video Processing Block Diagram for Single-Chip DLP Projector

FIG. 11 is an illustrative block diagram of the video processing system for a DLP projector as more fully described in "Video Processing for DLP® Display Systems" by Clantanoff T. Markandy and G. Pettitt from Texas Instruments website, www.ti.com/dlp, white paper section and hereby incorporated by reference. Information flow in this diagram is from left to right. In this illustrative system a video source input is supplied on the extreme left. The video source 1102 can be component, composite, NTSC, Y/C, PAL, or any other video format for which the projector has been designed to receive. The Font-End Video Processing block 1104 handles the initial conditioning and interpretation of the incoming video signal. The most important step in this block is the conversion of the analog video signal to digital data. Since the DMD chip is an inherently digital device, typically all video processing inside the projector is done digitally. Another important step is the conversion of the video signal to Y/C or chrominance/luminance format.

The second block in the video process is the Interpolation Processing block 1106. Since DMD chip devices have a higher pixel resolution than the incoming video data (e.g., 800×600, or 1024×768 pixels wide by pixels high) the video signal must be re-sampled at the higher resolution. Further, since many video formats are "interlaced", that is all odd lines are displayed and then all even lines are displayed, the signal must be converted from interlaced to progressive scan. Progressive scan means that data is displayed in the order that it comes from the top to the bottom (or vice versa) in a single scan or sweep. Since the DMD chip is a progressive scan device a progressive scan conversion must be performed on the video signal. Because of the way in which 3D stereoscopic images are transmitted in video signals it is possible for the Interpolation Processing block to degrade or scramble the left-eye and right-eye information carried in the video signal, depending on the algorithm implemented for the progressive scan conversion step. This will be discussed in greater detail below.

The final step, Back-End Processing 1108, splits the video input image or computer input image into the proper color space representation. That is, for the wheel shown in FIG. 8, the image is split into red, green, and blue components. For the wheel of FIG. 9 the image is split into red, green, blue, and white components. The output of this step is color space image information acceptable by the DMD chip driver circuitry 1110.

Dual Chip DMD Projection Systems

Dual-chip DMD projection systems are rare or non-existent in the market place. The idea was to use two DMD display chips and a two-color color wheel to display a full color image. The disadvantages of this system include added complexity due to the management of two DMD displays and retention of a mechanical color wheel filter system, among others.

Three Chip DMD Projection Systems

Three-chip DMD projection systems are gaining popularity in the large projector venue market. They consist of a complex optical prism system used to illuminate the three separate DMD display chips. The disadvantage of these systems is the higher cost of the multiple display devices and the more complicated optics. Advantages include the capacity for greater brightness and a reduction in complexity due to the absence of a mechanical color wheel filter.

Existing Stereoscopic Projection Systems

Existing 3D projection systems include micropolarizer (µPol) based projection systems; dual projectors and CRT based projection systems with a Z-Screen. Many of these are the subject of one or more patents or patent applications by the assignee of this application VRex, Inc. or its parent Reveo, Inc.

Christie and Barco Digital Three Chip Stereoscopic DLP® Projection System

Shortcomings of other projection systems and of the Christie and Barco 3D DLP projection system include the fact that the projector output is synchronized to the input. This means that the rate at which the projector displays the sequence of left and right images is the same is the input vertical synchronization signal. The result is that in order to reduce or eliminate flicker in the projected image, the input image source must be driven at a very high frame rate. An advantage of the present invention over prior art systems is that the input frame rate and the output frame rate can be completely decoupled, eliminating the need for expensive high-end computer equipment required to generate the high frame-rate images.

Off-the-Shelf Micro-Mirror Projection Systems

There are several brands of off-the-shelf DLP projection systems that have been found to support a form of "page-flipped" 3D output without any modifications. To view stereoscopic 3D images with such projectors, a pair of liquid crystal shutter glasses may be synchronized to the video input source or to the RGB computer input source. The major shortcoming of this solution is that the maximum input frame rate for the RGB computer input is typically 85 Hz (42.5 Hz per eye) and is not high enough to avoid noticeable flicker. This fact is also true for the video input that is fixed at around 60 Hz (30 Hz per eye). Another shortcoming is the fact that the flicker rate of the output is dependent on the input data frame rate.

The Problem

The fundamental problem of stereoscopic imaging is the display of two perspective images in such a way that they appear simultaneous to an observer and in such a way that the each eye sees only the corresponding perspective image. There are many systems in existence that provided this capability for stereo viewing by various different methods. The problem solved by this invention is the display of high-quality 3D stereoscopic images using a digital micro-mirror based optical system. Further, the present invention provides a means and apparatus to interpolate 3D image data from any input signal resolution to the display resolution without corruption due to the mixing of left-right perspective image data. All major stereoscopic data formats are supported. Further the present invention provides a system whereby 3D image decoding may be accomplished through one of three different decoding methods including passive linearly polarized eyewear, passive circularly polarized eyewear, active shutter glass eyewear or color filter based glasses. In the preferred embodiment the user may switch between any of the 3D optical encoding methods by simply changing an external filter assembly.

Micro-mirror display technology (such as that developed by Texas Instruments) as discussed above is well suited to stereoscopic display because of its fast switching times and extremely low persistence compared to liquid crystal based display technologies such as polysilicon, DILA™ (digital image light amplifier), and LCOS (liquid crystal on silicon). These properties that are inherent to DMD technology help to reduce stereoscopic crosstalk (the observed light leakage between left and right perspective views) in ways that are not possible by other 3D methods. Further, unlike some other 3D methods this invention permits the operation of the 3D projector in both stereoscopic and non-stereoscopic modes without any physical hardware or software changes required in switching between the two viewing methods. In addition to the 3D enhancements to DMD projectors, one aspect of the invention also has the capability of enhancing the brightness of 3D projection systems. This benefit is derived from the cholesteric liquid crystal reflective coatings used on certain color wheels variations and used as a stand-alone polarization plate.

BRIEF SUMMARY OF THE INVENTION

The invention has two main embodiments, a first called column switching and blanking and a second embodiment called column doubling. The first embodiment is a projector for displaying a stereoscopic image with projector using one or more digital micromirror devices positioned into a plurality of columns and rows. The projector itself includes a light source, an optical system, a video processing system and a data system for driving the micromirror devices. The data subsystem provides separate data to a plurality of column pairs of the micromirrors. The projector includes a stereoscopic control circuit having a first state of the control circuit for inputting a first eye view of the stereoscopic image and causing the micromirrors of a first column of each column pair to be in various on and off states during said first eye view of said stereoscopic image and for causing all of said micromirrors of a second column of each column pair to be in an off state during said first eye view of said stereoscopic image. A second state of the control circuit is used for inputting a second eye view of the stereoscopic image and causes the micromirrors of the second column of each column pair to be in various on and off states during the second eye view of the stereoscopic image and for causing all of the micromirrors of the first column of each column pair to be in an off state during the second eye view of said stereoscopic image.

The second embodiment is a projector for displaying a stereoscopic image with the projector using one or more digital micromirror devices positioned into a plurality of columns and rows The projector includes a light source, an optical system, a video processing system and a data system for driving said micromirror devices. The data subsystem provides separate data to a plurality of column pairs of the micromirrors. The projector includes a stereoscopic control circuit having a first state for inputting a first eye view of the stereoscopic image and causing each micromirror of each column pair to be in various but identical on and off states during said first eye view of said stereoscopic image. A second state of the control circuit for inputs a second eye view of the stereoscopic image and causes each micromirror of each column pair to be in various but identical on and off states during the second eye view of the stereoscopic image.

In any particular projector system the first eye view may represent either a left eye view or a right eye view and the second eye view is the other eye view.

DETAILED DESCRIPTION OF THE INVENTION

Figure 1:
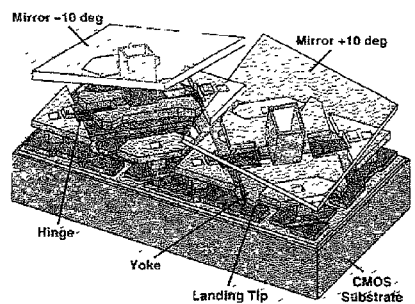
FIGS. 1 through 6 illustrate various portions of the DMD technology.
Figure 2:
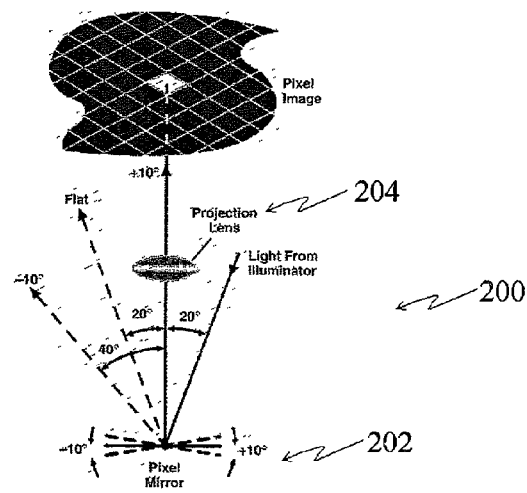
Figure 3:
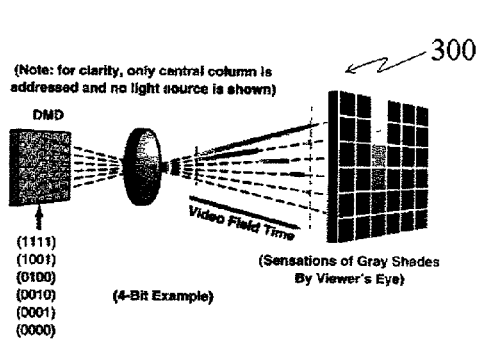
Figure 4:
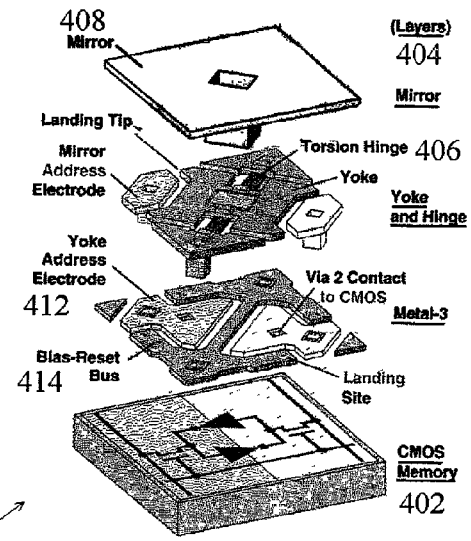
Figure 5:
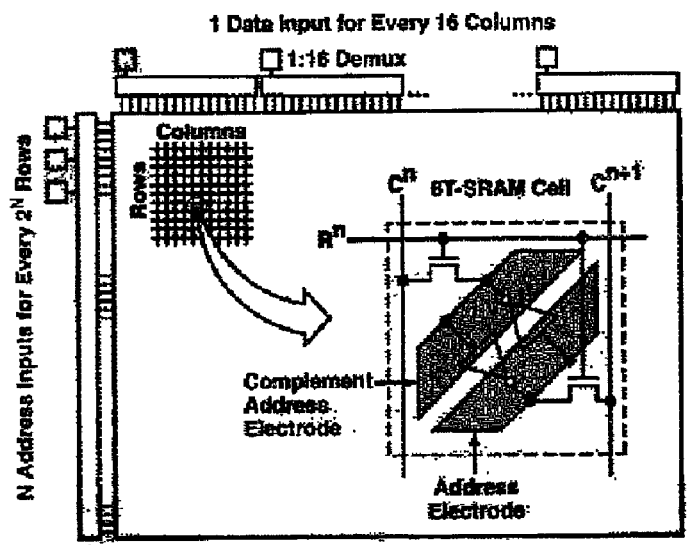
Figure 6:
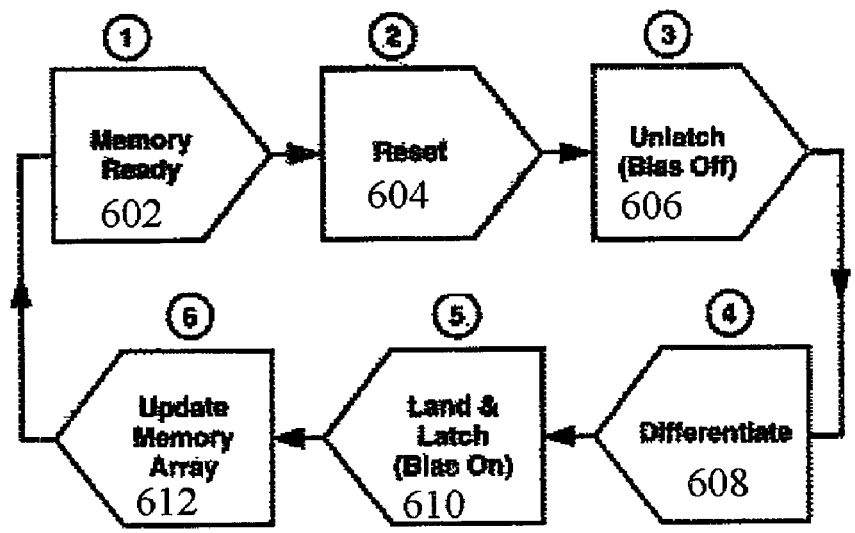
Figure 7:
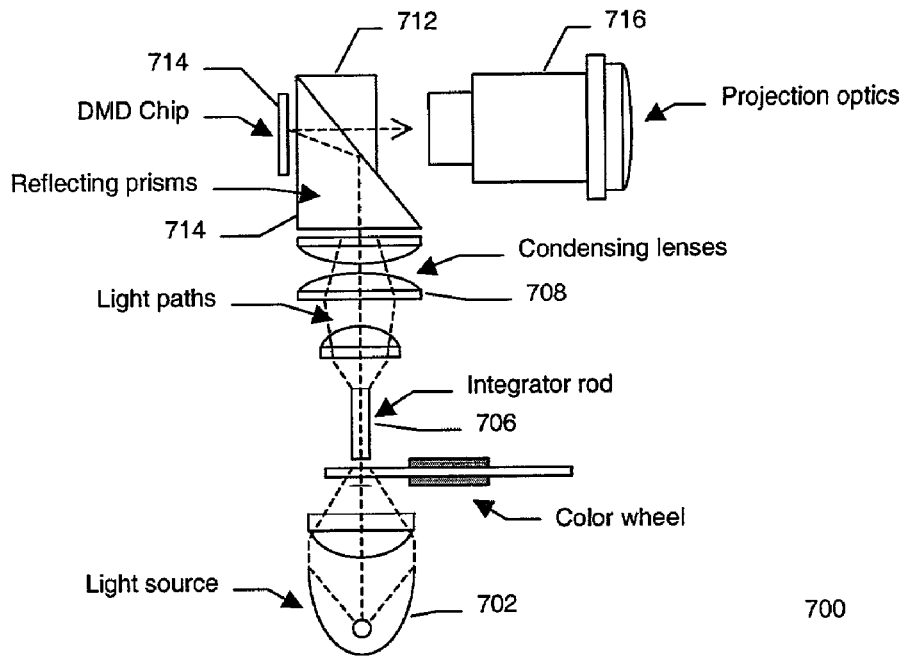
FIG. 7 illustrates a first example of a single-chip DMD projection system.
Figure 8:
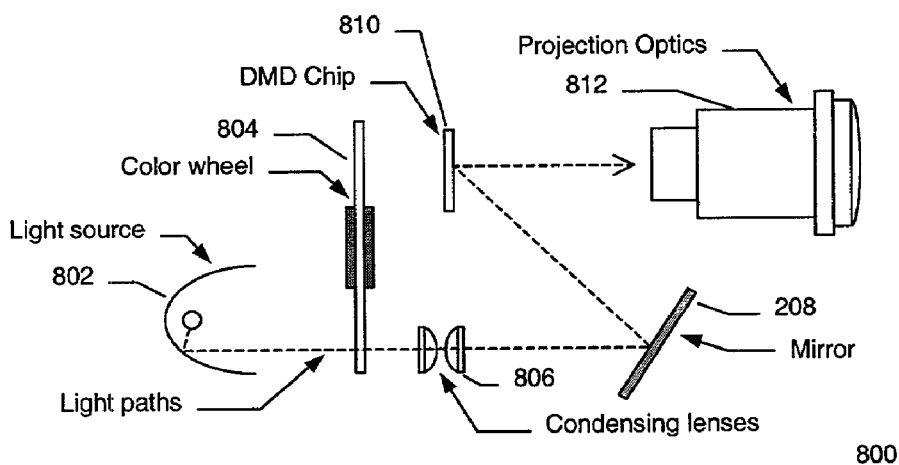
FIG. 8 illustrates a second example of a prior art single-chip DMD projection system.
Figure 9:
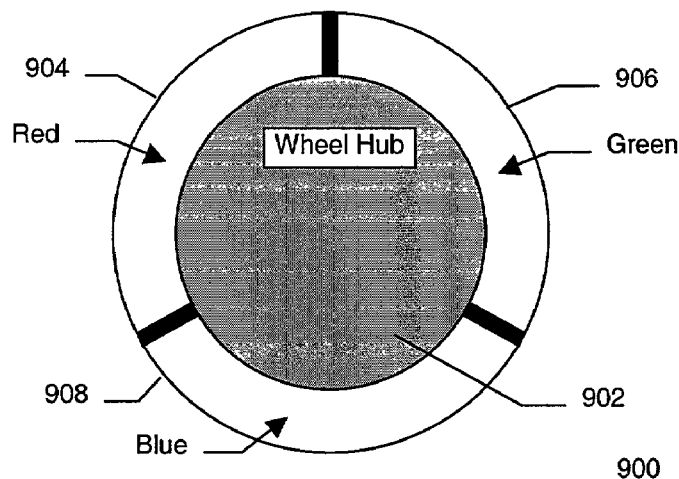
FIG. 9 illustrates a three-segment color wheel for single chip DMD projection systems.

The fundamental problem of stereoscopic imaging is the display of two perspective images in such a way that they appear simultaneous to an observer and in such a way that the each eye sees only the perspective image that corresponds to it. There are many systems in existence that provided this capability for stereo viewing by various different methods. The problem solved by this invention is the display of 3D stereoscopic images using DMD based optical systems configured in several different ways including the following: Single chip DMD with 3-color wheel; Single chip DMD with 4-color wheel; Dual chip DMD with 2-color wheel; Dual chip DMD with 3-color wheel; and Three chip DMD systems.

For each system configuration above there are one or more methods by which stereoscopic 3D display can be achieved. Using the DMD technology from Texas Instruments offers several advantages over other 3D methods. Properties inherent in the DMD chip help to reduce crosstalk between the eyes in a way that is not possible by other 3D methods. Further, unlike some other methods this invention permits the operation of the 3D projector in both stereoscopic and non-stereoscopic modes with out any physical hardware or software changes required in switching between the two viewing methods. In addition to the 3D enhancements to DMD projectors, one aspect of the invention also has the capability of enhancing the brightness of 3D projection systems. This benefit is derived from the cholosteric liquid crystal reflective coatings used on the color wheels for single and dual chip DMD systems as will be seen below.

Each embodiment relies on certain characteristics of a projector system. The projector system generally has two digital light processing chips on a formatter board. This formatter board takes the input video in places it into a format usable by the DMD device. Each control chip has 64 output lines. Each output line contains the data for micromirrors on 16 columns. These columns are not contiguous, but are either all even or all off numbered columns. Each column has 384 rows (in a 1024×768 chip having 786,432 mirrors) representing either the lower or upper half of the screen.

There are at least two methods for achieving stereoscopic (3D) viewing similar approach to line blanking methods previously used. The line blanking systems are disclosed in previous applications by the inventors including U.S. Pat. No. 6,456,432 issued Sep. 24, 2002 entitled "Stereoscopic 3-D Viewing System With Portable Electro-Optical Viewing Glasses and Shutter-State Control Signal Transmitter Having Multiple Modes of Operation for Stereoscopic Viewing of 3-D Images Displayed in Different", Ser. No. 10/110,265 filed on Oct. 5, 2000 (which is related to PCT/US00/27446) entitled "3D Shutter Glass and Line Blanker System", Ser. No. 09/269,990 filed on Apr. 22, 1999 entitled "Line Blanker System" and U.S. Pat. No. 5,821,989 issued on Oct. 13, 1998 entiled "Sterecoscopic 3D Viewing System and Glasses Having Electrooptical Shutters Controlled by Control Signals Produced Using Horizontal Pulse Detection Within the Vertical Synchronization Pulse Period of Computer Generated Video Signals". All of these are hereby incorporated by reference.

The first of these is a column blanking or column switching technique. The basics of the system are:

a) display a "column interleaved" image in which a left and right eye view is displayed. Let the left perspective (left eye view) image be displayed on the even (odd) columns and the right perspective (right eye view) be displayed on the odd (even) columns;

b) alternatively "blank" out the left image columns by switching to electrical ground all signal lines corresponding to even (odd) columns; alternatively "blank out the right image columns by switching to electrical ground all signal lines corresponding to off (even) columns;

c) at the same time provide a signal to a pair of external shutter glasses to close the left eye shutter of the pair of shutter glasses or switch the state of an internal polarizing optical rotator to block light from entering the eye of a user wearing standard polarizing 3D glasses and at the same time provide a signal to the pair of external shutter glasses to close the right eye shutter of the pair of shutter glasses or switch the state of the internal polarizing optical rotator to block light from entering the of a user wearing standard passive 3D glasses;

d) simultaneously open the left eye shutter and close the right shutter or switch the internal polarizing rotator to a right blocking mode and simultaneously open shutter and close left eye shutter or switch the internal polarizing rotator to a left blocking mode.

Figure 14:
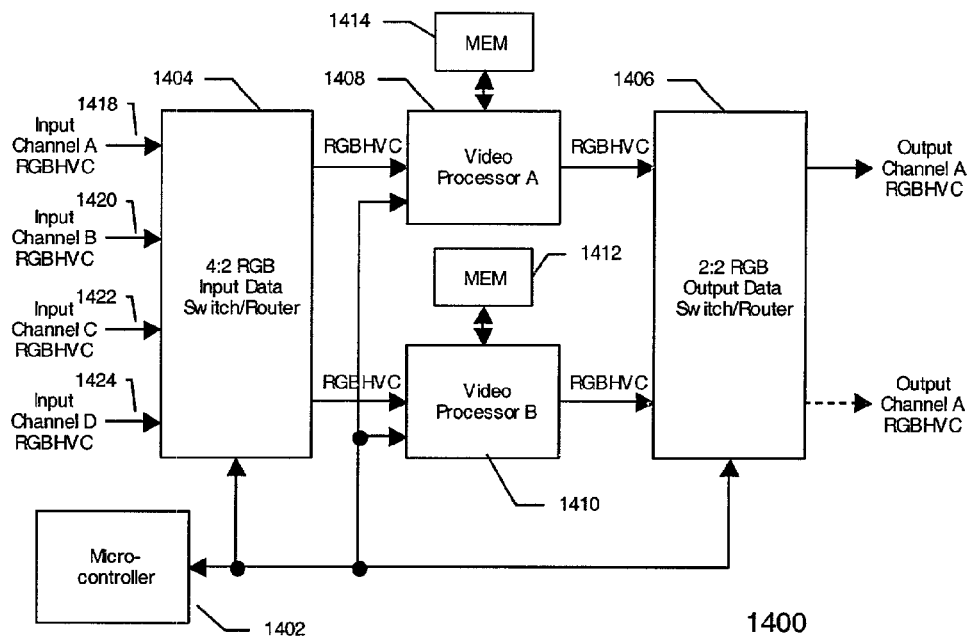
FIG. 14 illustrates the block diagram of a 3D data formatter.

An implementation of this column-blanking embodiment is illustrated in FIG. 14.

A variation of the column-blanking embodiment is known as the column doubling method. The basics of the system are:

a) display a "column interleaved" image in which a left and right eye view is displayed. Let the left perspective (left eye view) image be displayed on the even (odd) columns and the right perspective (right eye view) be displayed on the odd (even) columns.

b) alternatively "blank" out the left image columns by switching to electrical ground all signal lines corresponding to even (odd) columns; alternatively "blank out the right image columns by switching to electrical ground all signal lines corresponding to off (even) columns;

c) at the same time provide a signal to a pair of external shutter glasses to close the left eye shutter of the pair of shutter glasses or switch the state of an internal polarizing optical rotator to block light from entering the eye of a user wearing standard polarizing 3D glasses and at the same time provide a signal to the pair of external shutter glasses to close the right eye shutter of the pair of shutter glasses or switch the state of the internal polarizing optical rotator to block light from entering the of a user wearing standard passive 3D glasses;

d) simultaneously open the left eye shutter and close the right shutter or switch the internal polarizing rotator to a right blocking mode and simultaneously open shutter and close left eye shutter or switch the internal polarizing rotator to a left blocking mode.

Details of both of these are more fully described below.

Block Diagram of DLP Based 3D Stereoscopic Projection System

Figure 13:
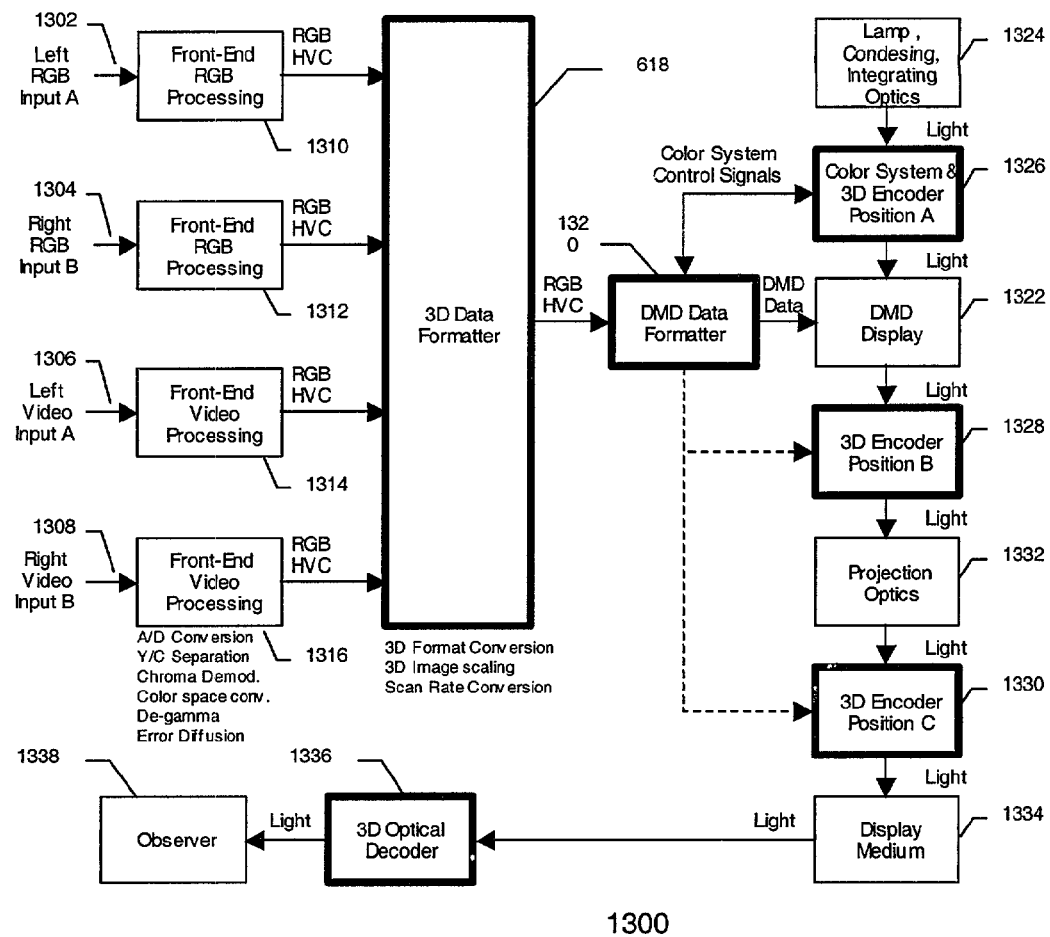
FIG. 13 illustrates the signal flos and optics block diagram.

A representative system diagram of the present invention 1300 is found in FIG. 13. The diagram demonstrates both the data flow and optical image flow of the system. The optical image flow is demonstrated by the term "light" and flows in the vertical direction with the exception of the bottom of the flow. Data flow is represented as horizontal channels starting on the left side of the figure and proceeding to the right. Starting in the upper left hand quadrant of the figure, the diagram illustrates four separate inputs; two for RGB (computer) 1302 and 1304 and two for video 1606 and 1608. Other input types are possible. For the video inputs, any or all of the three major video formats including composite, S-video, or component, may be implemented. To accommodate the widest variety of inputs possible, the preferred embodiment provides a total of eight separate inputs including left and right RGB, left and right composite video, left and right S-video, left and right component video.

To accommodate this number of inputs each of the Front-End Video Processing blocks 1314, and 1316 is capable of supporting three separate input formats, including composite video, S-video, and component video. Many modern video decoder chips support this level of functionality. The Front-End Video Processing blocks also handle analog-to-digital conversion (ADC) of the input video signals. Regardless of the input format, the output of the 3D Image Front-End RGB or Video Processing Block is a digital version of the selected input. The digital signal may take any of the standard digital video data formats including YUV 4:2:2, 24-bit RGB, 48-bit RGB, etc., depending on the price-performance requirements. The 3D format of the input image data may take any of the standard forms. For video input signals the 3D format is typically field sequential 3D (left-right image data are transmitted on alternate fields of the video signal) or dual input 3D (left-right image data are input on two physically separate input connectors). Other functions of the Front-End RGB or Video Processing blocks 1310, 1312, 1314, or 1316 include gain control, color and brightness control, video format decoding (NTSC, PAL, SECAM, etc.) and other features that may be associated with video signal decoding.

The Front-End RGB Processing blocks 1310 and 1312 each support the input of three separate color channels (red, green, and blue) as well as two synchronization signals (vertical and horizontal). Each of the front-end processing blocks is used to convert an analog video or computer signal into a standardized digital format. In the preferred embodiment all analog inputs are converted to the 24-bit RGBHVC (red, green, blue, horizontal sync, vertical sync, and pixel clock) digital format. Numerous other digital formats could be chosen as well depending on the desired price-performance factors. There are a wide variety of 3D formats for computer RGB input including page-flipped (left-right image data are transmitted on alternate video frames of a single physical channel), over-under (left-right image data are transmitted on the top and bottom halves of a single video frame in one physical channel), side-by-side (left-right image data are transmitted on left and right halves of a single video frame in one physical channel), row-interleaved (left-right image data are transmitted on alternate rows of a single video frame in one physical channel), column-interleaved (left-right image data are transmitted on alternate rows of a single video frame in one physical channel), and dual-input (left-right image data are transmitted on two physically separate channels).

The 3D Data Formatter block 1318 performs several major functions including input channel selection, stereoscopic demultiplexing, stereoscopic image scaling, scan rate conversion, and stereoscopic 3D format conversions. Based on input selection settings, the 3D Data Formatter chooses which of the four input channels to use for 3D stereoscopic input. Typically only one or two channels will be chosen at a time depending on which 3D format is being input. Next the 3D Data Formatter demultiplexes or separates 3D stereoscopic data into two separate image-processing channels. It is extremely important that this separation step be performed so that the left-perspective image data and right-perspective image data may be processed separately. Processing the channels together as one data frame will cause corruption of the data during the image scaling and scan conversion processes. Next the 3D Data Formatter 1318 performs an image scaling operation to adjust the image resolution to that required by the DMD Data Formatter. Typically the resolution corresponds to the native resolution of the DMD display but may vary in some instances. Depending on the data format chosen for communication with the DMD Data Formatter, the 3D Data Formatter may perform a scan conversion of the image data. If the output data format is Input Synchronized no scan conversion is performed. This is the case where the input data signal frame rate controls the internal data frame rate of the system and where the 3D output rate of the projector is directly controlled by the input signal. If the output data format is Output Synchronized, a scan conversion is performed to synchronize the processed 3D image data with the projector optical output frame rate. In this case the 3D output rate of the projector is completely independent of the input signal frame rate. There are advantages and disadvantages for both methods. Finally the 3D Data Formatter 1318 performs a 3D stereoscopic format conversion to recombine the processed stereoscopic image data into the format required by the DMD Data Formatter 1320. Many possibilities exist for the 3D format of this data output depending on several factors including the method used to implement the DMD Data Formatter 1320, the method used to display 3D image data, and the method used to optically encode the left- and right-perspective images.

The primary purpose of the DMD Data Formatter 1320 is to convert processed 3D stereoscopic image data in the RGBHVC format into the data and control signals required to drive the DMD display 1322 in the chosen 3D Display Format. A secondary purpose is to control the color management system that drives the color wheel filter. A tertiary purpose is to provide a 3D Field signal output to synchronize the 3D Encoder system with the 3D image data display. There are numerous variations for the means and apparatus to implement the DMD Data Formatter depending on the 3D optical encoding method and the 3D Display Format chosen.

The choice of which method to use depends on the desired application as well as price-performance factors.

The DMD Display 1322 encodes digital electronic data into an optical image. It consists of hundreds of thousands of bi-stable microscopic mirrors that reflect light either out through the projection lens system or back into the light engine. Grayscale images are achieved by pulse-width modulation of individual mirror pixels. The speed at which the mirrors change is orders of magnitude faster than the speed of liquid crystal based displays making the DMD display ideal for use with time-sequential 3D display systems. The DMD Display required by the present invention is not fundamentally different that those currently used in projection industry. This concludes the summary overview of the data flow aspect of the present invention.

We now turn to a description of optical image flow description of the present invention. Starting in the upper right-hand corner of FIG. 13, the Lamp and Condensing, Integrating Optics block 1324 represents all electrical and optical components that generate and collect light for the rest of the projection system. This block is not fundamentally different from existing light generation systems in current use.

The Color System and 3D Encoder Position A block 1326 consists of a rotating color wheel and, depending on the 3D Encoding method chosen, one or more optical components that aid in optically encoding 3D stereoscopic images. The primary responsibility of the Color System is to sequentially filter light emanating from the Lamp optics into three or four separate colors. A secondary purpose of the Color System is to aid in polarization of the light for use in optically encoding 3D images. The 3D Encoder System optically encodes 3D images for transmission to the observer through one of several means including linear polarization, circular polarization, color sequential encoding, and time-sequential encoding. Components of the 3D Encoder system may be physically located in one of several positions, indicated in the figure by Position A 1326, Position B 1328, and Position C 1330. The choice depends on the means used to implement the 3D Encoder System. There are numerous possibilities for the implementation of the Color System and the 3D Encoder System. In some instances the two systems are completely separate and in other instances they are inextricably woven together. The various options and possibilities are discussed in detail later.

The next component in the optical path is the DMD Display 1322. The data aspects of this block were discussed previously. Optically the DMD Display 1322 consists of the actual DMD display chip and any optics required to reflect light onto and off of the display chip. As previously stated, the DMD display and its optics are not fundamentally different that what is in current use in the projection industry. Virtually any single-chip DMD display system in current use may be utilized in the present invention.

The 3D Encoder Position B block 1328 represents a physical location between the DMD Display and the Projection Optics at which portions or all of the 3D Encoder System may be located. Position B is located inside the projector housing.

The Projection Optics block 1332 consists of the projection lens, focusing system, zoom system, optical keystone correction (if any) that are used to project the image displayed by the DMD Display block. This system is not fundamentally different than any in use today. The choice of projection optics depends on the DMD Display used and on other cost-performance factors as well as the desired application.

The 3D Encoder Position C 1330 block represents a physical location just beyond the Projection Optics at which portions or all of the 3D Encoder System may be located. Position C is located outside the projector housing. The advantage of this configuration is that the Encoding System optics may be configured for removal depending on the desired use and application.

The Display Medium 1334 is simply the screen (either front or rear) upon which the image is displayed. If any of the polarization methods for 3D Encoding are used, then the Display Medium 1334 must have the ability to reflect or transmit polarized light to the observer.

The 3D Optical Decoder block 1336 represents any of the various means that may be used to decode optical 3D image data for presentation to the appropriate eye of the observer. These means typically consist of some type of eyewear that must be worn by the observer. Options include passive linearly polarizing glasses, passive circularly polarizing glasses, active liquid crystal shutter glasses, and active color filter glasses.

3D Data Formatter Overview

The 3D Data Formatter 1400 performs five major functions including input channel selection, stereoscopic demultiplexing, stereoscopic image scaling, scan rate conversion, and stereoscopic 3D format conversion. These functions are realized in the preferred embodiment by the system represented in FIG. 14. The 3D Data Formatter block 1400 consists of five major components including a Microcontroller Unit 1402, a four input two output RGB Input Data Switch/Router System 1404, a two input two output RGB Output Data Switch/Router System 1406, and two separate Video Processing Units 1408 and 1410 with associated memory 1412 and 1414. The most prominent feature of the 3D Data Formatter System is the dual video processor configuration that enables independent image processing for both left- and right-perspective image data. Separate image processors are an important feature and a major distinction between the present invention and other prior art projection systems. The dual-processor configuration provides the highest-image quality available while preventing stereoscopic degradation by keeping left and right image data completely separate.

The 4-to-2 RGB Input Data Switch/Router System 1404 is essential a matrix switch for RGBHVC data signals that has the ability to route any input to any or both outputs depending on the 3D Format of the input signal. For instance, in the case where Input Channel A 1418 contains both left and right perspective image data, the Input Switch will route Input Channel A 1418 to both outputs for further manipulation by the Video Processors. In the case that left and right perspective image data are carried on two separate channels, Channel A 1418 and Channel B 1420 for example, each input is routed to a single output. In the preferred embodiment this switch is implemented using a high-speed CPLD integrated circuit.

The two Video Processor blocks 1408 and 1410 and are sophisticated video processing circuits with the ability to perform many useful functions including image resizing, scan rate conversion, color correction, and keystone correction. These processors can control the position in memory of up to four separate consecutive input image data frames and up to four separate output data frames. These features make it possible for each Video Processor to operate on a specific set of image data corresponding to the left or right perspective image. Working in conjunction with the Input Data Switch/Router, virtually any 3D stereoscopic data format may be accommodated. Once the appropriate image data set has been isolated by the input frame controls, each video processor performs the required scaling and image enhancement operations. The Video Processor blocks 1408 and 1410 also act as dual port memory controls. This means that the output data rate may be independent of the input data rate. Input and output data rates are determined by the horizontal sync, vertical sync and pixel clock signals. The preferred embodiment uses two IPOOC711 chips from iChips, Inc. as the Video Processor blocks. Other video processor integrated circuit chips with similar functions and features may also be used. The memory blocks used in the preferred embodiment are 16-megabit SDRAM devices. Sufficient memory is provided to accommodate four complete frame buffers for each Video Processor corresponding to the four frame controls. This configuration provides the maximum control and flexibility required for this system.

The 2-to-2 RGB Output Data Switch/Router block 716 is another RGBHVC digital matrix switch that is capable of routing either input to either output in any possible combination. It is also capable of routing any color data associated with the two input channels to any color location of the two output channels. This feature allows the use of color sequential methods for 3D image encoding. This switch works together with the two Video Processor blocks 708 and 710 to realize all possible 3D data formats that may be used for transmission to the DMD Data Formatter block 700. In the preferred embodiment the output of each Video Processor block 708 and 710 is a 24-bit RGB signal that consists of 8-bits for each color red, green, and blue. To accommodate the color multiplexing feature the Switch 714 is capable of routing any color input to any other color output. Therefore the Switch 1414 is actually a 6-input 6-output matrix switch for 8-bit digital signals. In the preferred embodiment this switch is implemented using a high-speed CPLD integrated circuit.

The Microcontroller block 1402 performs the setup and control functions of the 3D Data Formatter. It uses an EEPROM memory 1410 and 1414 to store register settings for each of the Video Processor blocks and data switches. It also interfaces with the user control functions of the projection system and reconfigures the register settings based on user input.

3D Data Formatter Input Variants

In the preferred embodiment of the present invention the 3D Data Formatter 1400 provides a means and apparatus to accommodate numerous 3D formats from a variety of sources. There many different methods used by 3D content providers to encode 3D image data into video or computer data formats. Each major 3D format is supported to provide the widest application possible. The major 3D formats supported by the present invention are described below. A representative configuration of the Input Switch 1404 and the two Video Processor blocks 1408 and 710 are also described.

Dual Channel 3D Format Input

The Dual Channel 3D Format involves the transmission of left- and right-perspective stereoscopic images on physically separate channels. This format is utilized when two separate video cameras are combined to make a single stereoscopic camera. The present invention accommodates the Dual Channel 3D Format by setting the Input Data Switch to route each input channel to a single separate Video Processor 1408 and 1410. For instance if the two video sources are present in Input Channel C 1422 and Input Channel D 724, then Channel C 722 is routed to Video Processor A 1408 and Channel D 1424 is routed to Video Processor B 1424. Other combinations are, of course, possible. Another major feature of the present invention that stems from the fact that two separate Video Processors are used is that the both channels of the Dual Channel 3D Format may be synchronized independently of one another. This ability stems from the fact that each Video Processor input may be driven independently. Synchronization of the two channels occurs at the output of the Video Processor blocks.

Single-Channel Frame-Sequential 3D Format Input

Single-Channel 3D Formats seek to multiplex left- and right-perspective stereoscopic images on a single physical channel. There are many different methods employed to accomplish this task. Frame-Sequential 3D Format time-multiplexes the stereo image data based on the Vertical Sync signal of a computer data output. This means that the 3D field changes at every vertical sync pulse. One way in which the present invention demultiplexes this format is to route the selected input channel to both Video Processor blocks. Video Processor A 1408 is then set up to process only "even" frames of image data while Video Processor B 1410 is set up to process only "odd" frames. The use of "even" and "odd" terms is for convenience only since the RGB port of a computer makes no distinction between even and odd image data frames. However, in the case where the computer supports a VESA standard stereo jack, the even and odd frame definitions may be derived from the Frame ID signal of the port.

Single-Channel Field-Sequential 3D Format Input

The Field-Sequential 3D Format is very similar to the Frame-Sequential format but applies to video signals instead of computer RGB signals. In this case the selected channel is routed to both Video Processors 1408 and 1410 as in the previous case. Since many video formats (e.g., NTSC, PAL) distinguish between even and odd fields of each frame of video data, it is possible for the Video Processor blocks 1408 and 1410 to process only even or odd fields of each video frame.

Single-Channel Row Interleaved 3D Format Input

The Row-Interleaved 3D format is another RGB computer format that multiplexes stereoscopic image data based on the horizontal sync signal. This results in a row-by-row multiplexing pattern. One of several methods by which the present invention may demultiplex the Row Interleaved 3D format is to route the single input to both Video Processor blocks 1408 and 1410 and then set the memory control registers 710 and 714 of each Video Processor such that only odd or only even rows are available for processing. Another method is to setup the Input Data Switch 704 to route the selected input channel to both Video Processors 1408 and 1410 in such a way that rows that are not to be processed are blanked out. For instance if Video Processor A 1408 is to operate on information encoded on the even lines, then the Input Data Switch 1404 will blank out the odd lines. No matter the method used to demultiplex the row-interleaved format images, each Video Processor 1408 and 1410 will apply a base scale factor of 2 in the vertical direction to restore the images to full height. Other scale factors may be applied to format the resulting image to the native resolution of the display.

Single-Channel over-under 3D Format Input

The Over-Under 3D Format encodes left and right stereoscopic image data into the top and bottom half of each image frame. For instance one Over-Under method encodes right-perspective data in the top half and left-perspective data in the bottom half of each image frame. One of many ways the present invention may demultiplex Over-Under 3D Format data is to route the selected input to both Video Processor and then set the memory control registers 1414 and 1410 such that Video Processor A 1408 operates on the top half of each frame only and Video Processor B 1410 operates on the bottom half of each frame. Other methods are also possible. Finally, each Video Processor 1408 and 1410 will apply a base scale factor of 2 in the vertical direction to restore the images to full height. Other scale factors may be applied to format the resulting image to the native resolution of the display.

Single-Channel Side-By-Side 3D Format Input

The Side-By-Side 3D Format encodes left and right perspective image data on the left and right sides of each image frame. As in the previous cases, one method by which the present invention demultiplexes stereoscopic information in this format is to route the selected channel to both Video Processors. The memory control registers for each Video Processor are then setup such that Video Processor A 1408 operates on only the left side of each frame and Video Processor B 1410 operates on the right side of each frame. Similar to the previous single-channel formats, each Video Processor will apply a base scale factor of 2 in the horizontal direction to restore the images to full width and maintain the proper aspect ratio. Other scale factors may be applied to format the resulting image to the native resolution of the display.

Single-Channel Column Interleaved 3D Format Input

The Column Interleaved 3D Format encodes left and riht perspective image data on alternating columns of the image frame. This format corresponds to a change in the 3D field for every pixel clock pulse. As in the previous cases the present invention provides several options for demultiplexing this type of 3D format including blanking columns of data on the input pixel clock or by routing the select channel to both Video Processors and then setting memory control registers such that only even or odd columns are processed.

3D Data Formatter Output Variants

Just as the 3D Data Formatter is capable of receiving 3D data in many different formats, so too can it transmit processed 3D data in one of many different formats depending on the 3D optical encoding method employed. For any instantiation of the present invention, typically only one of the many 3D optical encoding methods available would be used for the construction of a 3D projection system based on this system. However it is conceivable that there are some cases for which two or more 3D encoding methods may be implemented in a single projection system depending on the application. To provide the widest range of possibilities, the preferred embodiment of the present invention provides a means and apparatus to implement all of the following 3D data formats for transmission of 3D stereoscopic information from the 3D Data Formatter to the DMD Data Formatter.

Frame-Sequential 3D Format: encodes left and right perspective image data on alternate frames of the output.

Over-Under 3D Format: encodes left and right perspective image data in a single image frame by encoding one perspective image in the top half and the other in the bottom half of each frame.

Side-by-Side 3D Format: encodes left and right perspective image data in a single image frame by encoding one perspective image in the left side and the other in the right side of each frame.

Row-Interleaved 3D Format: encodes left and right perspective image data in a single image frame by encoding one perspective image in the even rows and the other in the odd rows of each frame.

Column-Interleaved 3D Format: encodes left and right perspective image data in a single image frame by encoding one perspective image in the even columns and the other in the odd columns of each frame.

Dual-Frame Color Multiplexed Format: encodes left and right perspective image data in two output image frames by color multiplexing. For example, one possible realization of this format is to encode the red and blue portions of the right image and the green portion of the left image into the first frame and then to encode the red and blue portions of the left image and the green portion of the right image into the second frame.

Dual Channel 3D Format: encodes left and right perspective image data in two physically separated transmission channels.

Figure 15:
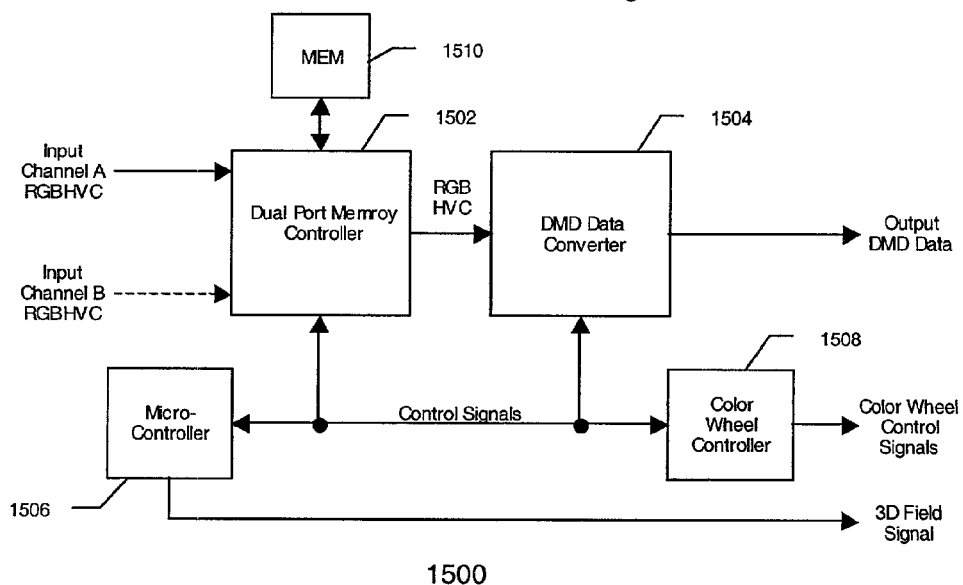
FIG. 15 illustrates the block diagram of a DMD data formatter.

In addition, each of the 3D data transmissions formats may be used in either an Input Synchronization mode or an Output Synchronization mode. Input Synchronization mode means that data transmission between the 3D Data Formatter 1400 illustrated in FIG. 14 and the DMD Data Formatter 1500 illustrated in FIG. 15 is synchronized to the external 3D signals that are input to the projector. The result is that the input signal determines the rate at which 3D images are displayed by the projector. If the data rate of the input signal is too low (typically below 90 Hz) there will be a noticeable flickering of the 3D images displayed by the projector. Output Synchronization Mode means that the data transmission between the 3D Data Formatter 1400 and the DMD Data Formatter 1500 are synchronized independently of the external 3D input signals. The Output Synchronization rate is set internally to the projection system and is set to a level high enough to avoid flicker issues. Both methods are provided by the present invention because there are advantages and disadvantage to both methods. The choice of one method over another will be determined by the intended use and application of the end product.

The entire list of input and output 3D Formats supported by the 3D Data Formatter 700 is presented in Table 2.

TABLE 2

List of Input and Output Formats Supported by the 3D Data Formatter

| 3D Inputs | 3D Outputs |
| --- | --- |
| Dual-Channel | Input Synchronized Frame-Sequential |
| Frame-Sequential | Input Synchronized Over-Under |
| Field Sequential | Input Synchronized Side-by-Side |
| Row Interleaved | Input Synchronized Row-Interleaved |
| Over-Under | Input Synchronized Column-Interleaved |
| Side-By-Side | Input Synchronized Dual Frame Color Multiplexed |
| Column-Interleaved | Input Synchronized Dual Channel |
| | Output Synchronized Frame-Sequential |
| | Output Synchronized Over-Under |
| | Output Synchronized Side-by-Side |
| | Output Synchronized Row-Interleaved |
| | Output Synchronized Column-Interleaved |
| | Output Synchronized Dual Frame Color Multiplexed |
| | Output Synchronized Dual Channel |

DMD Data Formatter

DMD Data Formatter Overview

The main purpose of the DMD Data Formatter 1500 as illustrated in FIG. 15 is to convert processed 3D stereoscopic image data in the RGBHVC format into the data format required by the DMD Display chip 1322 for proper operation. The DMD Data Formatter 1500 also provides control signals for the Color Management System (including the rotating color wheel filter) and the 3D Encoder/Decoder system 1326, 1328, and 1330. The DMD Data Formatter 1500 consists of four major components including a Dual Port Memory Controller 1502, a DMD Data Converter 1504, a Microcontroller 1506, and a Color Wheel Controller 1508.

The DMD Data Formatter 1500 receives input from the 3D Data Formatter in one of the predefined 3D Formats mentioned above. The Dual Port Memory Controller 1502 receives RGB data and writes it to memory in a manner set by the Microcontroller 1506. For any instantiation of the present invention only one "write" method is typically used. The Dual Port Memory system (that includes the Dual Port Memory Controller and the memory itself) 1502 may consist of a single frame buffer, a dual frame buffer, or a quad frame buffer depending on cost-performance factors. The preferred embodiment implements a dual frame buffer system. There are also three major options for implementation of the timing input data including 60 Hz Output Synchronized, 120 Hz Output Synchronized, and Variable Rate Input Synchronized. The various options for implementation and their meanings are presented below.

The DMD Data Converter 1500 reads data from the Dual Port Memory and reformats it for display. Since the single-chip DMD projection system uses a rotating color wheel to sequentially construct a full color image, the rate at which the DMD Data Converter accesses data in the Dual Port Memory system is significantly faster than the rate at which data is written. The exact manner in which the DMD Data Converter accesses data is determined by the Color Management system and the 3D Encoding system.

The Color Wheel Controller 1508 manages the rate at which the color wheel spins based on the rate at which data is being transmitted to the DMD Display 1322. The rate of rotation is variable based on the frame rate of the input and whether or not the projector is in Input Synchronized mode or Output Synchronized mode.

The Microcontroller 1506 sets the register values for the Dual Port Memory System 1502 and 810, the DMD Data Converter 1504 and the Color Wheel Controller 1508 based on the 3D Format of the input, the color management mode, and the 3D Encoding method. The Microcontroller 1506 also sets the 3D Field Signal used by the 3D Encoding and Decoding Systems.

DMD Data Formatter Output Methods (3D Display Methods)

Since the present invention is based on using a single-DMD chip, all methods for the display of 3D stereoscopic images involve time-sequential optical encoding. The DMD Display chip 1322 is eminently suitable for time-sequential based encoding because of its low latency and super fast switching times. There are identified four major categories of DMD Data Formatter 1504 outputs that correspond directly to the 3D Display Method of the entire projection system. These output categories include Input Synchronized Frame Sequential 3D Output, Input Synchronized Color Sequential 3D Output, Output Synchronized Frame Sequential 3D Output, and Output Synchronized Color Sequential 3D Output. Each of these four major output categories is discussed in greater detail below.

Input Synchronized Frame Sequential 3D

The term Input Synchronized Frame Sequential 3D output means that the 3D Field Rate of the projector (rate of switching between left and right perspective images) is dictated by the input signal frame rate and that each 3D Field consists of a full color left or right perspective image. Based on this description it would seem logical at first glance that the Color Wheel should also rotate at the same rate as the input signal. However, since the color wheel is composed of either three or four distinct color filter types (red, green, blue, and/or white) and since the relative intensity between any two color may be vastly different depending on the image to be displayed, there may be an observable flickering of the projector for input signals whose frame rate is too low. To solve this problem, monoscopic DMD projector manufacturers speed up the rotation of the wheel to as much as twice the rate of the input data frame rate so that the rate of change of the color filters is beyond detection by the human eye. However, since there are limits to the speed at which the color wheel may rotate, the monoscopic projectors may display an input data frame for more than a single rotation of the color wheel. This solution keeps the color change rate high without over taxing the DMD Data Formatter 1500 and color management system. A similar technique must be applied in the present invention for Input Synchronized 3D output.

Figure 16:
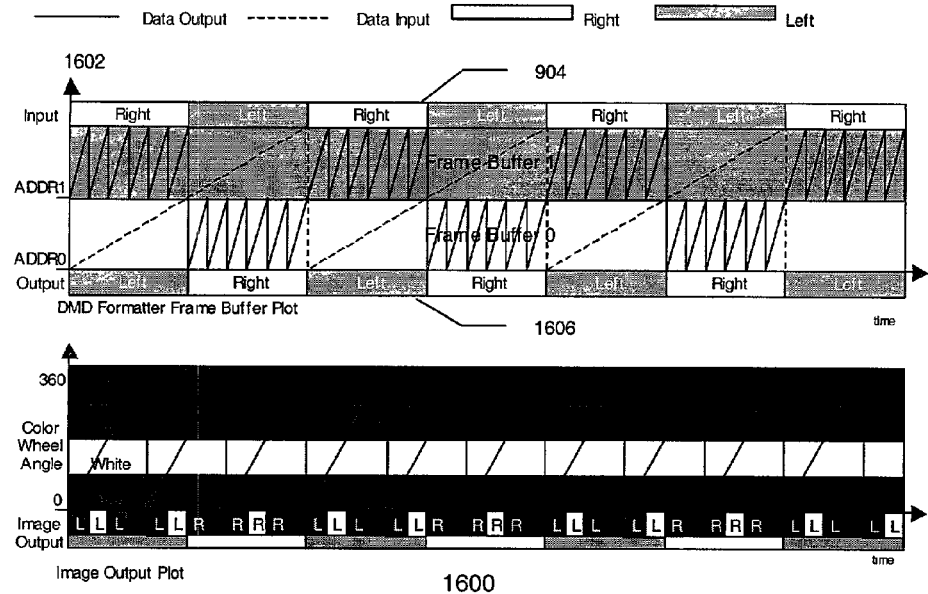
FIG. 16 illustrates a DMD data formatter chart for Input Synchronized Frame Sequential3D Input using Four Segment Color Wheel (chart applies to 75 Hz, 80 Hz, 85 Hz input signals)
Figure 17:
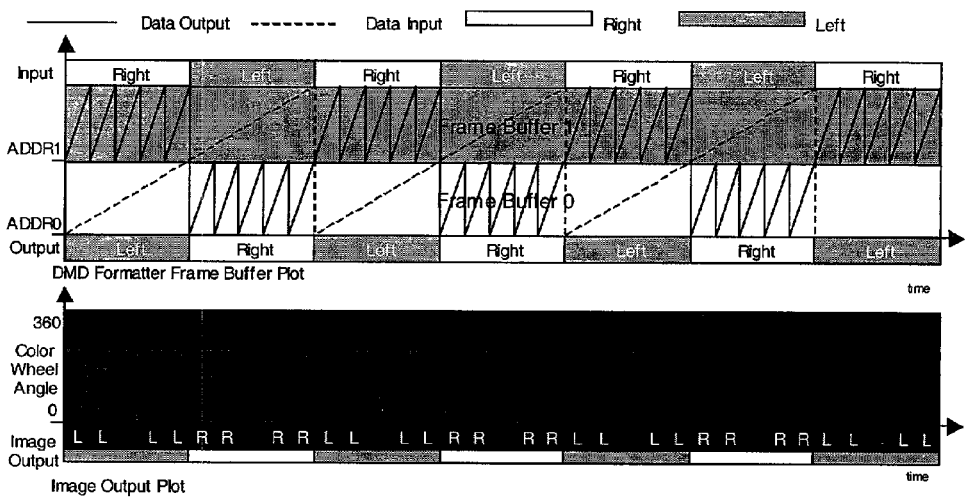
FIG. 17 illustrates a DMD data formatter chart for Input Synchronized Frame Sequential 3D Input using Three-Segment Color Wheel (chart applies to 72 Hz, 75 Hz, 80 Hz input signals)

To illustrate this type of 3D output FIG. 16 illustrates two charts 1600 demonstrating one method by which the DMD Data Formatter 1500 works in conjunction with the DMD Display 622 and a four-segment color wheel to display Input Synchronized Frame Sequential 3D output. The chart also illustrates Input Synchronized Frame-Sequential data transfer from the 3D Data Formatter. The top chart (denoted "DMD Formatter Frame Buffer Plot") 1602 represents operation of the Dual Port Memory System of the DMD Data Formatter 800. In this case the Dual Port Memory is implemented using a dual frame buffer. The input line at the top of the frame buffer 1604 plot represents the 3D data input to the DMD Data Formatter Dual Port Memory 1502 and 1510. Gray boxes denote left image data and white boxes denote right image data. The y-axis of the Frame buffer plot represents locations in memory while the x-axis represents time. Dashed lines represent data written to the memory and solid lines represent data read out of the memory. Finally the output line 1606 of the DMD Formatter Frame Buffer Plot represents the 3D Format of data transmitted to the DMD display.

The bottom chart ("Image Output Plot") represents the input-output relationship of the combination DMD Display/Color Management System. Rows labeled with the names of colors (e.g., red, white, green, and blue) represent the angular position of the color wheel, ranging from 0° to 360° on the y-axis. The solid black line within this region of the graph represents the position of the color wheel. The x-axis represents elapsed time. The output row represents the actual optical output of the DMD Display/Color Management system combination. L represents left-eye perspective data and R represents right-eye perspective data. Finally the black and white rectangles below the Output row reiterate the sequence of 3D output frames.

Both plots in the figure correspond to each other in time. Starting at time zero we see that data are being read at six times the input frame rate (there are six saw-tooth pulses for every input frame). This represents the transfer of red image data for the first left perspective image to the DMD Display.

The result on the output of the projector (Input Output row of the bottom plot) is the red portion of the left-perspective image. Notice that the data are being read from Frame Buffer 1 while new data are being written simultaneously into Frame Buffer 0. During the next frame (a left perspective image), data are being written into Frame Buffer 1 while data are read for display from Frame Buffer 0. This is the basic operation of the dual frame buffer configuration.

Figure 10:
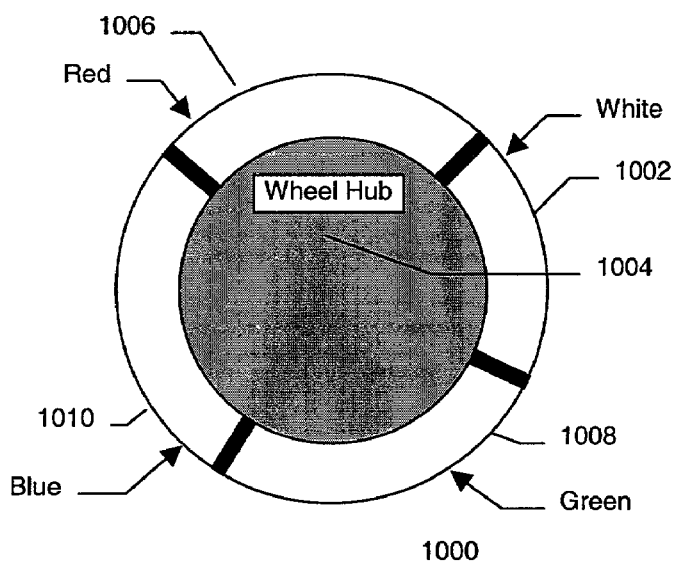
FIG. 10 illustrates a four-segment color wheel for single chip DMD projection systems.
Figure 11:
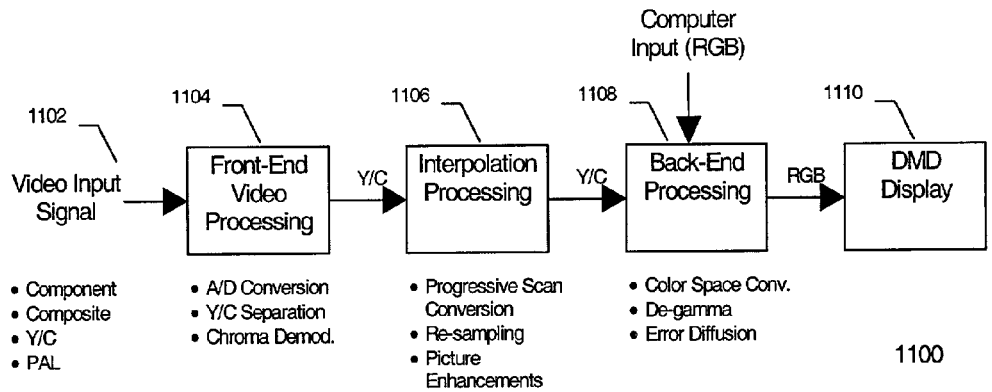
FIG. 11 illustrates a prior-art DMD projector video processing block diagram for single-chip DLP projector.
Figure 12:
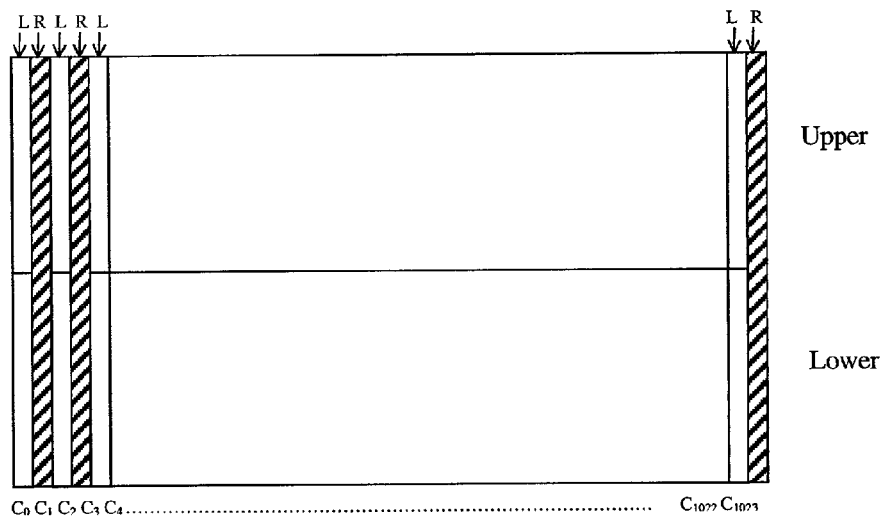
FIG. 12 illustrates the column structure.

In practice, instead of doubling the rotation rate of the color wheel to prevent color flicker, the color wheel speed is adjusted such that the nearest color boundary coincides with a frame boundary of the input. In the simplified case shown in FIG. 10, the color wheel is divided into four equal segments of Red, Green, Blue, and White color filters. In practice the white filter may be smaller than the other filters. In the preferred embodiment the color wheel spins at a nominal rate of 120 Hz resulting in color transition rate of 4 times 120 Hz or 480 Hz. Now suppose, for example, that the input frame rate is 75 Hz. Dividing the color transition rate by the input frequency and rounding to the nearest integer yields the total number of color time periods per input frame period. In this case we have 480 Hz divided by 75 Hz equals 6.4. Rounding to the nearest integer results in the number 6. Therefore if we alter the speed of the color wheel such that 6 complete color filter transitions occur for every input data frame then the desired page-flipped output may be achieved with the minimal perceived color flicker. The required color wheel frequency is calculated by multiplying the input frame rate (75 Hz) by the computed number of color time periods, 6, and then dividing by the number of colors on the wheel, 4. The result is a color wheel rate of 112.5 Hz. Table 3 shows the computed color wheel rotation rates, color transitions per input frame and the color transition rate for various input refresh rates using a four-segment color wheel.

TABLE 3

Input Synchronized Frame Sequential 3D Color Wheel Rates for Four-Segment Wheel

| Input Frame Rate | Color Wheel Rate (Hz) | Color Transitions per Input Frame | Color Transition Rate (Hz) |
| --- | --- | --- | --- |
| 60 | 120 | 8 | 480 |
| 72 | 126 | 7 | 504 |
| 75 | 112.5 | 6 | 450 |
| 80 | 120 | 6 | 480 |
| 85 | 127.5 | 6 | 510 |
| 90 | 112.5 | 5 | 450 |
| 100 | 125 | 5 | 500 |
| 110 | 110 | 4 | 440 |
| 120 | 120 | 4 | 480 |

Figure 20:
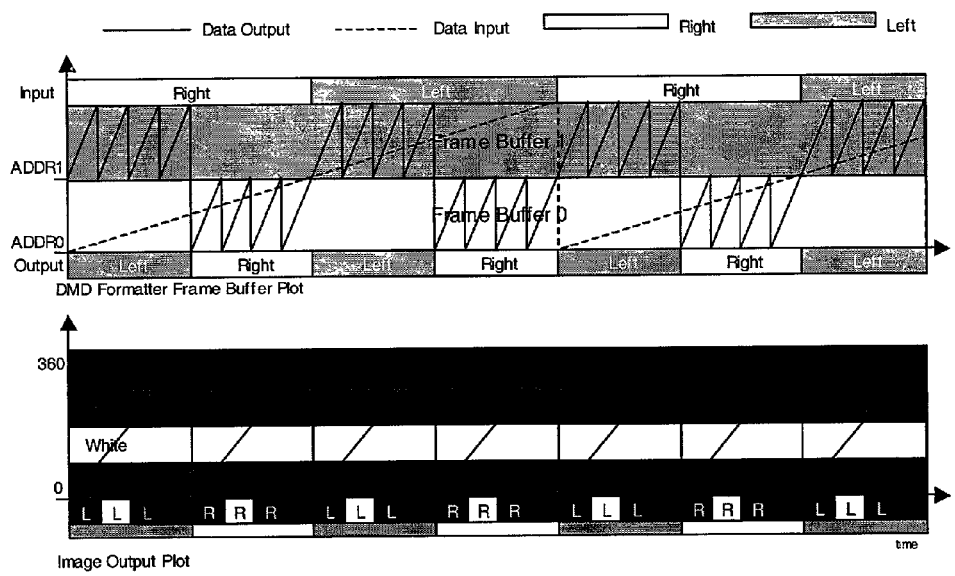
FIG. 20 illustrates a DMD formatter chart for Output Synchronized Frame Sequential 3D format for 60 Hz Input using a Four-Segment Color Wheel.

FIG. 20 illustrates the same set of charts as described above except that a three-wheel system is used instead of the four-segment color wheel system. computed color wheel rotation rates, color transitions per frame and the rates for a three-segment color wheel system using the same input ame sequential 3D format.

TABLE 4

Input Synchronized Frame Sequential 3D Color Wheel Rates for Three-Segment Wheel

| Input Frame Rate | Color Wheel Rate | Color Transitions per Input Frame | Color Transition Rate (Hz) |
| --- | --- | --- | --- |
| 60 | 120 | 6 | 360 |
| 72 | 120 | 5 | 360 |
| 75 | 125 | 5 | 375 |
| 80 | 133.33 | 5 | 400 |
| 85 | 113.33 | 4 | 340 |
| 90 | 120 | 4 | 360 |
| 100 | 133.33 | 4 | 400 |
| 110 | 110 | 3 | 330 |
| 120 | 120 | 3 | 360 |

Input Synchronized Color Sequential 3D

The term Input Sychronized Color Sequential 3D output means that the 3D Field Rate of the projector (rate of switching between left and right perspective images) is dictated by the input signal frame rate and that each 3D Field consists of one single color of the left or right perspective image. The advantage of this output system is that even though the 3D Field rate is dependent on the input, flicker free operation can now be guaranteed since the switching occurs at the same rate as the color transition rate. As seen in Table 3 this rate varies between 440 Hz and 510 Hz for the four segment color wheel while Table 4 indicates the rate to range between 330 Hz and 400 Hz depending on the input frame rate.

Figure 18:
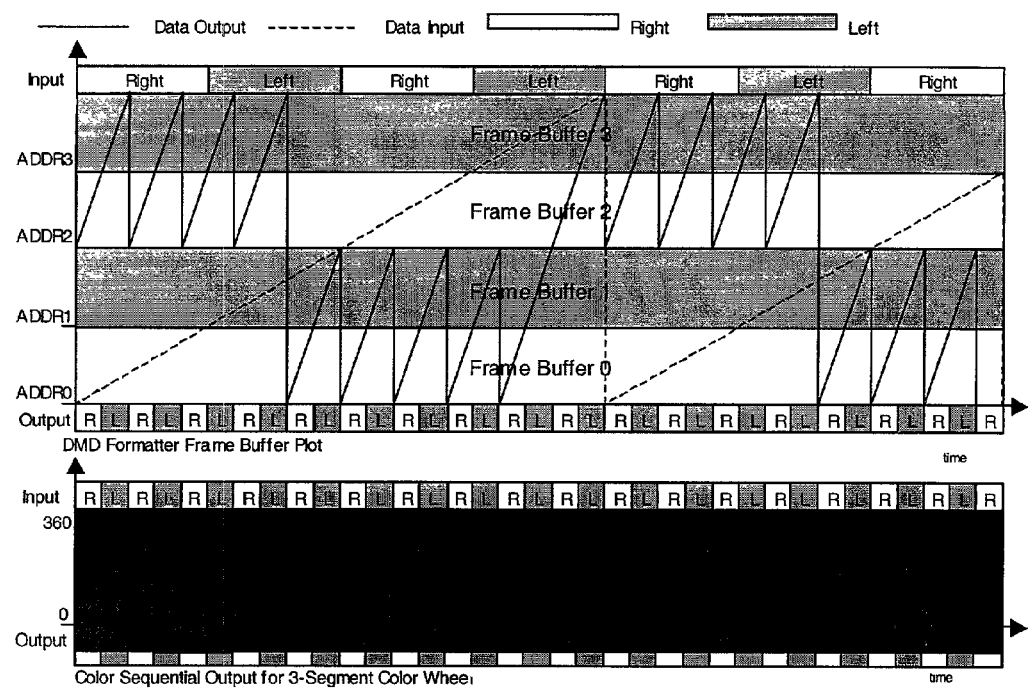
FIG. 18 illustrates Input Synchronized Color Sequential 3D using a Three Segment Color Wheel and Quad Frame Buffer (chart applies to 72 Hz, 75 Hz, and 80 Hz input signals)

There are numerous variations of the DMD Data Formatter and Color Management System that can be used to realize Input Synchronized Color Sequential output. FIG. 18 illustrates the output format chart for one such variation. In this case the DMD Data Formatter Dual Port Memory System is realized using a quad frame buffer. Input from the 3D Data Formatter is in the Input Synchronized Frame Sequential Format. As can be seen on the DMD Formatter Frame Buffer Plot, input data frames are written to Frame Buffer 0 through Frame Buffer 3 in order. This action causes Frame Buffer 0 and 2 to contain only right perspective data and Frame Buffer 2 and 3 to contain only left perspective data. DMD Data Formatter output is read out of the memory in a very different format. In this case data are read from pairs of Frame Buffers as shown. Starting in the middle of the first Left input frame, the output is taken from Frame Buffer 0 followed by Frame Buffer 1. This cycle is repeated for a total of five times after which the output is taken from Frame Buffer 2 followed by Frame Buffer 3. The output is timed so that image data are read at the soonest possible moment after writing without causing a rollover error. In this case the output is delayed by 1.5 input frames. The resulting DMD Data Formatter output switches between left and right perspective image data at every color transition as is shown on the Output line of the Frame Buffer Plot. The lower chart in the figure illustrates the three-segment color wheel plot for Color Sequential Output. The Output line of the lower chart represents the actual output of the projection system. In this case the order is red-right, green-left, blue-right, red-left, green-right, blue-left. Thus over the course of two complete revolutions of the color wheel, two complete full color perspective images are constructed. This version of the Color Sequential Format is called Alternate Color.

Figure 19:
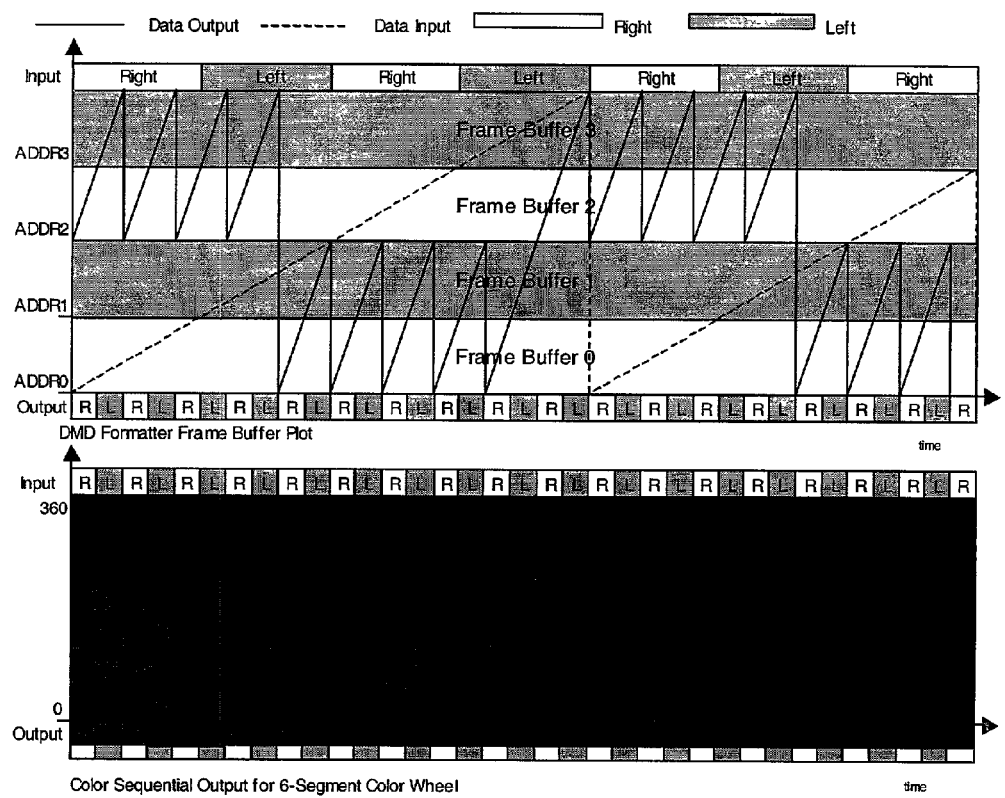
FIG. 19 illustrates Input Synchronized Color Sequential 3D using a Six-Segment color Wheel and Quad Frame Buffer (chart applies to 72 Hz, 75 Hz, and 80 Hz input signals)

FIG. 19 illustrates the output format chart for another method available to realize Input Synchronized Color Sequential 3D output. In this case the Color Sequential sub-Formnat is called "Double Color" since each color is repeated twice, once for the right-perspective image and once for the left perspective image. Another feature of this configuration is that the color wheel is composed of six-segments instead of three. From the lower plot we can see that each color filter is divided into two separate regions corresponding to the left and right perspective images. This color wheel configuration will be discussed in greater detail later. In all other respects this configuration operates as the previous configuration in that a quad frame buffer is used to implement the Dual Port Memory of the DMD Data Formatter. Data transfer into and out of the buffer is identical to that presented previously. It should be noted that there are many other possibilities for implementation.

In addition to the two examples presented there are other possibilities for implementation of the Input Synchronized Color sequential method. These include other methods based on six-segment and eight-segment color wheels. A complete list of all 3D Display Output formats is located in Table 5.

TABLE 5

3D Display Formats

| Num | 3D Display Method | Synchronization Method | Format | Sub-Format | Color Wheel Configuration |
|---|---|---|---|---|---|
| 1 | ISFSPF3 | Input (variable) | Frame Sequential | Page-Flipped | 3-segment |
| 2 | ISFSPF4 | Input (variable) | Frame Sequential | Page-Flipped | 4-segment |
| 3 | ISFSPF6 | Input (variable) | Frame Sequential | Page-Flipped | 6-segment |
| 4 | ISFSPF8 | Input (variable) | Frame Sequential | Page-Flipped | 8-segment |
| 5 | ISCSAC3 | Input (variable) | Color Sequential | Alternate Color | 3-segment |
| 6 | ISCSAC6 | Input (variable) | Color Sequential | Alternate Color | 6-segment |
| 7 | ISCSAC8 | Input (variable) | Color Sequential | Alternate Color | 8-segment |
| 8 | ISCSDC6 | Input (variable) | Color Sequential | Double Color | 6-segment |
| 9 | ISCSDC8 | Input (variable) | Color Sequential | Double Color | 8-segment |
| 10 | OSFSPF3-60 | Output (60 Hz) | Frame Sequential | Page-Flipped | 3-segment |
| 11 | OSFSPF4-60 | Output (60 Hz) | Frame Sequential | Page-Flipped | 4-segment |
| 12 | OSFSPF6-60 | Output (60 Hz) | Frame Sequential | Page-Flipped | 6-segment |
| 13 | OSFSPF8-60 | Output (60 Hz) | Frame Sequential | Page-Flipped | 8-segment |
| 14 | OSCSAC3-60 | Output (60 Hz) | Color Sequential | Alternate Color | 3-segment |
| 15 | OSCSAC6-60 | Output (60 Hz) | Color Sequential | Alternate Color | 6-segment |
| 16 | OCSCAC8-60 | Output (60 Hz) | Color Sequential | Alternate Color | 8-segment |
| 17 | OCSCDC6-60 | Output (60 Hz) | Color Sequential | Double Color | 6-segment |
| 18 | OCSCDC8-60 | Output (60 Hz) | Color Sequential | Double Color | 8-segment |
| 19 | OSFSPF3-120 | Output (120 Hz) | Frame Sequential | Page-Flipped | 3-segment |
| 20 | OSFSPF4-120 | Output (120 Hz) | Frame Sequential | Page-Flipped | 4-segment |
| 21 | OSFSPF6-120 | Output (120 Hz) | Frame Sequential | Page-Flipped | 6-segment |
| 22 | OSFSPF8-120 | Output (120 Hz) | Frame Sequential | Page-Flipped | 8-segment |
| 23 | OSCSAC3-120 | Output (120 Hz) | Color Sequential | Alternate Color | 3-segment |
| 24 | OSCSAC6-120 | Output (120 Hz) | Color Sequential | Alternate Color | 6-segment |
| 25 | OCSCAC8-120 | Output (120 Hz) | Color Sequential | Alternate Color | 8-segment |
| 26 | OCSCDC6-120 | Output (120 Hz) | Color Sequential | Double Color | 6-segment |
| 27 | OCSCDC8-120 | Output (120 Hz) | Color Sequential | Double Color | 8-segment |

Out Synchronized Frame Sequential 3D

Output Synchronized Frame Sequential 3D means that the 3D Field Rate of the prjector (rate of switching between left and right perspective images) is dictated by the internal color management system and that each 3D Field consists of a full color left or right perspective image. In this case the 3D Field Rate is completely independent and decoupled from the input data frame rate. Output Synchronized 3D Display for mats enable flicker free 3D stereoscopic display regardless of the input frame rate. In the prefered embodiment the color wheel rotation rate is set at 120 Hz. This rate is the nominal rotation rate for many existing monoscopic projectors (e.g., Plus U2-1080). It provides a 3D Field Rate well above that which is detectable by the human eye.

Since the output display rate of the projector is independent of the input rate for this mode, there exists a freedom of choice for the rate at which data are transmitted from the 3D Data Formatter 700 to the DMD Data Formatter 800. Since the color wheel rotaion rate is set at 120 Hz, it is convenient to make provisions for a 60 Hz and a 120 Hz 3D Data Formatter 716 output data rate. Because of its lower performance demands, the 60 Hz rate will cost less to implement but may suffer from rollover errors in the dual port memory for some configurations. The 120 Hz data rate provides a higher level of performance and visual quality at a higher implementation cost. There are numerous possibilities for implementing the present invention using Output Synchronized Frame Sequential output. A complete list is presented in Table 5. Three examples from these lists are presented below.

FIG. 20 illustrates the output format chart for the 60 Hz Output Synchronized Frame Sequential 3D method. In this case the DMD Data Formatter Dual Port Memory is configured as a dual frame buffer system. The input data rate is 60 Hz and the color wheel rotation rate is 120 Hz. Also a four-segment color wheel system is used to enhance the overall brightness of the image output. As in previous cases input form the 3D Data Formatter 1400 is encoded in the frame sequential 3D format. Starting at the left side of the DMD Formatter Frame Buffer Plot, input data is written at address ADDR0 and subsequent addresses as time passes. This configuration causes Frame Buffer 0 to contain only right perspective image data and causes Frame Buffer 1 to contain only left perspective image data. The DMD Data Converter 1500 reads data from the dual port memory as indicated by the solid line in the upper plot. Starting at ADDR1 in Frame Buffer 1, data for the red portion of a left perspective image is read followed by white, then green, and then finally blue. The cycle then continues for the next color wheel rotation except that the start address for reading is now set to ADDR0 in Frame Buffer 0. This causes red, white, green, and blue data for a right perspective image to be used for display. A disadvantage of the 60 Hz input format can be seen at this point in the fact that the DMD Data Converter 1504 reads the right-red data faster than it is being written. This means that at each point in the plot where the solid line (read) crosses the dashed line (write) a transition will occur between the current perspective image frame and the previous perspective image frame. This may result in a noticeable distortion in the displayed image. The lower plot of FIG. 20 illustrates the 120 Hz frame sequential optical output of the projector.

Figure 21:
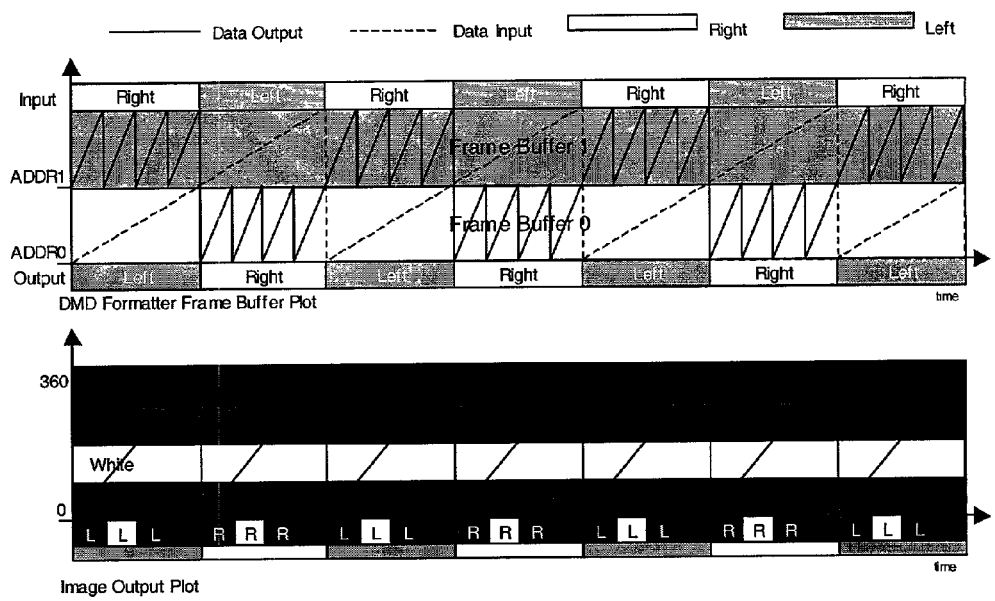
FIG. 21 illustrates a DMD formatter chart for Output Synchronized Frame Sequential 3D format for 120 Hz Input using a Four-Segment Color Wheel.
Figure 22:
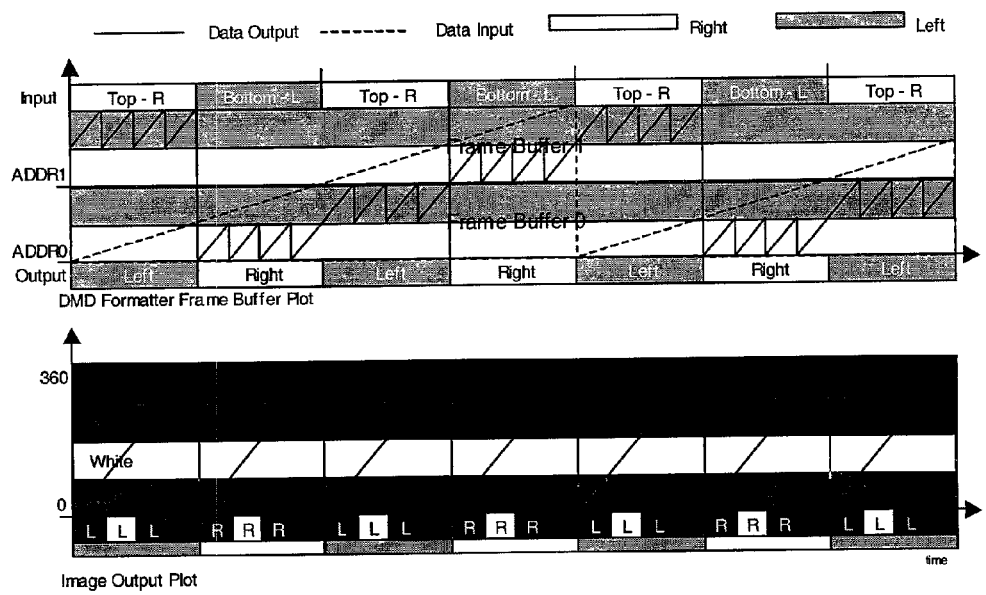
FIG. 22 illustrates a DMD formatter chart for Output Synchronized Frame Sequential 3D format for 60 Hz Over-Under 3D Input using a Four-Segment Color.
Figure 23:
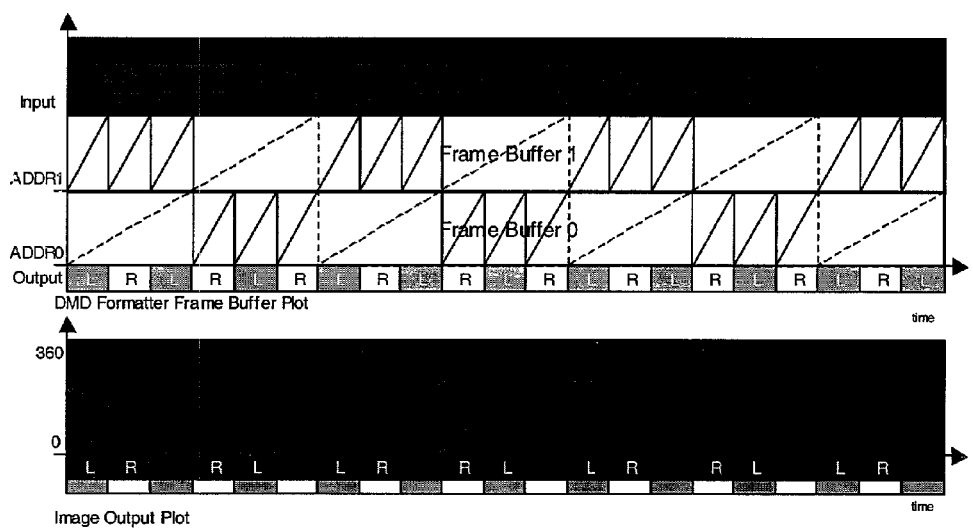
FIG. 23 illustrates a DMD formatter chart for Output Synchronized Color Sequential 3D format for 120 Hz Color-Sequential 3D Input, using a Three-Segment Color Wheel.
Figure 24:
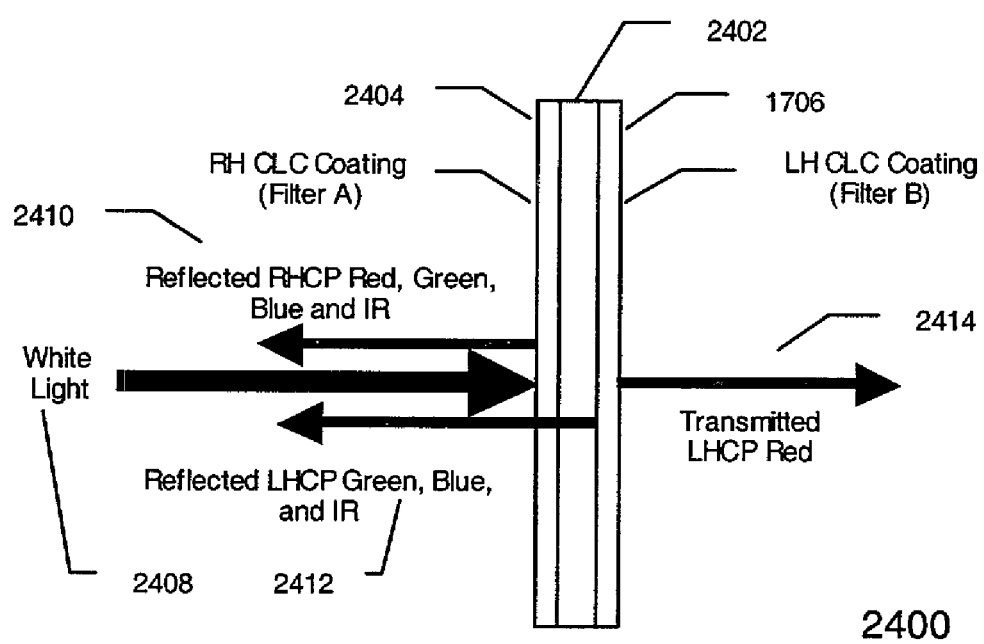
FIG. 24 illustrates a cholosteric liquid crystal reflective circular polarizing red filter (similar for white, green, or blue)

FIG. 21 shows the 120 Hz input version of the same configuration. This is the Output Synchronized Frame Sequential 3D output format for 120 Hz input. The major difference between this configuration and the previous configuration is that data transfer from the 3D Data Formatter 1400 to the DMD Data Formatter 1500 takes place at 120 Hz. The result is that rollover errors in the Dual Port Memory 1510 are eliminated as can be seen by the absence of any intersections between the read and write lines in the upper plot of the figure. All other operation is the same as the 60 Hz input example.

Figure 25:
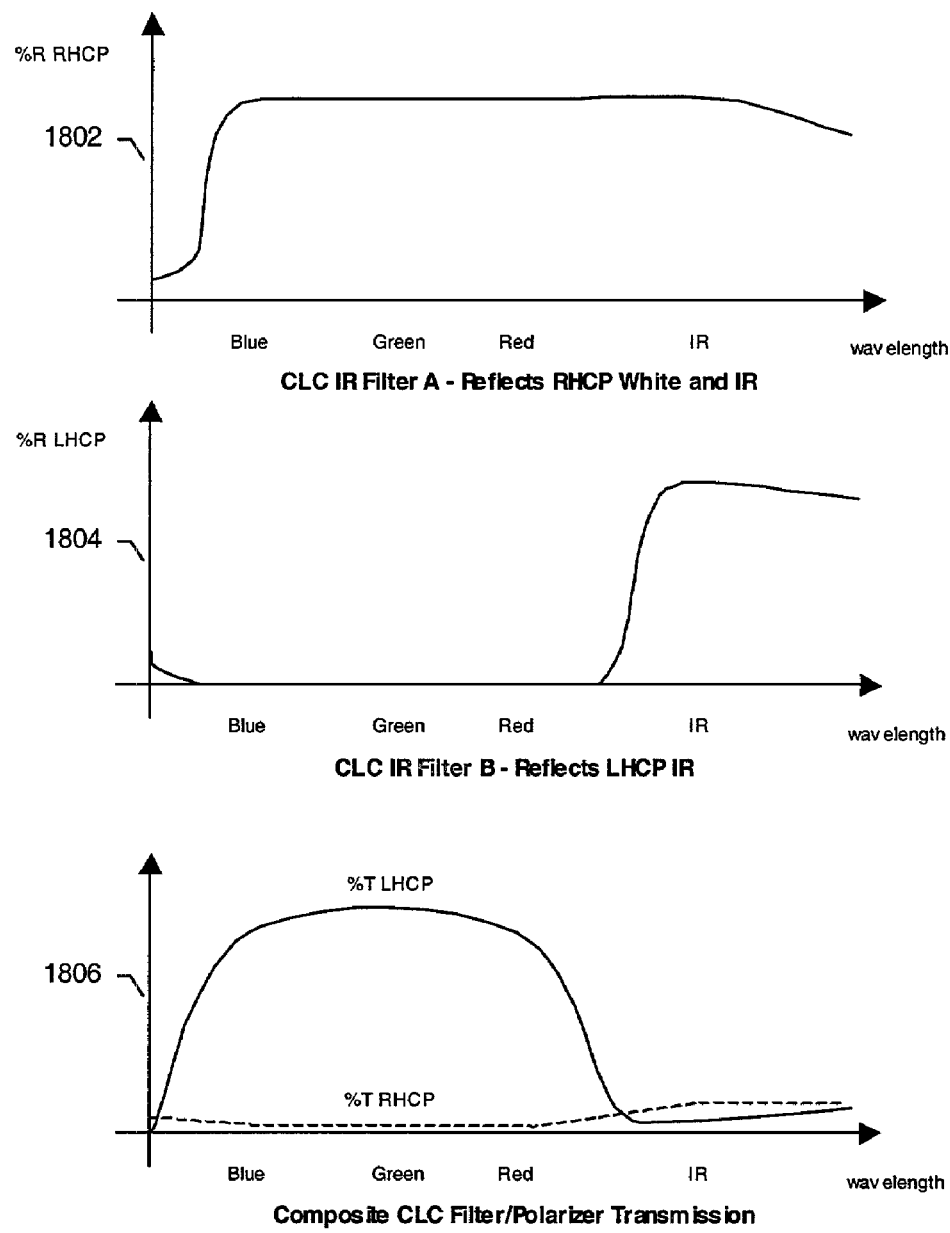
FIG. 25 illustrates the Spectral Response for a CLC Filter/Circular Polarizer.

To this point each of the examples given has used a frame sequential 3D format to transfer data between the 3D Data Formatter 1400 and the DMD Data Formatter 1500. FIG. 25 illustrates an output format plot in which the over-under 3D format is used instead. This figure represents the Output Synchronized Frame Sequential 3D output configuration with 60 Hz Over-Under input. The only differences between this example and the example of FIG. 20 occurs in the way data is read out of the Dual Port Memory 1510. Since 3D perspective data is written to the Dual Port Memory 810 in the Over-Under format, Frame Buffer 0 and Frame Buffer 1 each contain both left and right perspective image data such that the lower half of each buffer contains (in the example) right-perspective information and the upper half of each buffer contains left-perspective information. To read data for display, an alteration is made in the memory access control registers of the DMD Data Converter so that it only scans one half of the frame buffer. The DMD Data Converter must then scale the image to the full height for display using one of several potential methods including row-blanking (each row of the output image is set to black), row-doubling (each row is repeated to fill up the entire screen), or any other scaling method. The resulting 3D output is the same as in the previous Output Synchronized Frame Sequential Formats. An advantage of the over-under 3D format for DMD Data Formatter input is that it reduces the input-output delay to one half of a frame. A disadvantage is that the effective vertical resolution may be cut in half depending on the 3D format of the input to the projection system.

It should be noted that a similar DMD Data Converter scaling operation would be used in the case where the side-by-side 3D format is used for input to the DMD Data Formatter. For that case scaling methods could include column blanking, column doubling, or any other standard scaling technique.

Output Synchronized Color Sequential 3D

Figure 26:
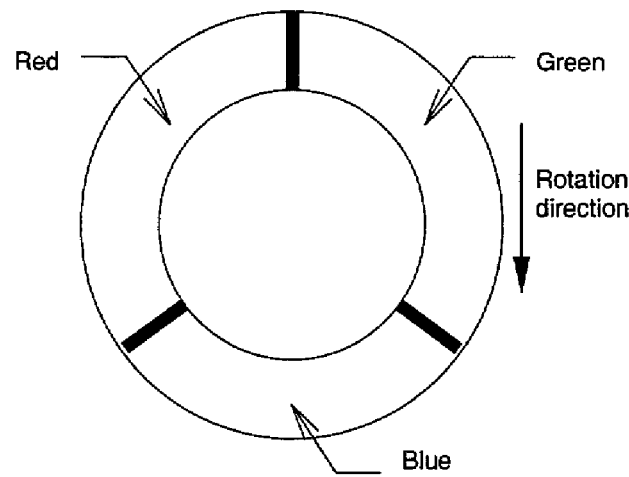
FIG. 26 illustrates a Three-Segment Color Wheel type CW-A.

The Output Synchronized Color Sequential 3D Format is similar to the Output Synchronized Frame Sequential format except that left and right perspective images are encoded by color rather than by frame. FIG. 26 illustrates an output format plot of one of many configurations that may be used to realize this format. In this example 3D data input to the DMD Data Formatter 1500 are formatted in the Color Multiplexed 3D format at a data rate of 120 Hz. The color management system uses a three-segment color wheel for display. The Input line of the DMD Formatter Frame Buffer Plot illustrates how left and right perspective data are multiplexed into the colors of each frame. The first frame in the plot has right image data encoded in the red and blue channels and left image data encoded in the green channel. The next frame inverts the encoding method with the red and blue channels carrying left image data and the green channel carrying right image data. As in the previous three-segment color wheel examples, the DMD Data Converter 1500 reads data from the dual port memory three times for every rotation of the color wheel. Data are read and displayed in the following order: red-left, green-right, blue-left, red-right, green-left, and blue-right. The result is that the 3D Field rate becomes extremely high guaranteeing flicker free operation. There are many other options for implementation of the Output Synchronized Color Sequential 3D format that are listed in Table 5.

DMD Data Formatter Variations

As is ascertained form the previous description there are many variations of the physical implementation of the DMD Data Formatter 1500. The choice depends on the desired performance characteristics and the desired application.

Dual Port Memory Configurations including Single Frame Buffer, Dual Frame Buffer, and Quad Frame Buffer implementations. Data input may have variable or fixed rates and may be synchronized internally (with respect to the Color Management System) or externally (with respect to the video or computer input signals).

3D Optical Encoding Methods

The present invention provides for various methods to optically encode stereoscopic images for display and transmission to the observer. As was indicated in FIG. 13 there are various options for the location and configuration of components used to optically encode 3D images. In order to encode separate left and right perspective images in the same optical channel, the various available properties of light must be exploited. These properties include the speed of light (for time-sequential multiplexing), the visible spectrum (for color-sequential multiplexing), and the polarization properties. The present invention utilizes five major optical components in order to optically encode 3D stereoscopic images using these various properties of light. These components included the color wheel, a cholesteric liquid crystal (CLC) circularly polarizing filter (CPF), a ¼ wave retarder, an linearly polarizing filter (LPF), and an active (electrically switchable) liquid crystal rotator. These components, used in conjunction with the various 3D Display Methods previously discussed may be configured to produce a total of 23 3D optical configurations. The complete list of optical configurations and the components used is found in Table 6 and FIGS. 38–42. We now turn to a brief discussion of each of the five optical components.

(center) 2702, a right handed (RH) CLC coating 2704 (on the left side) and a left-handed (LF) CLC coating 2706. Right-handed CLC reflects right-handed circularly polarized light and left-handed CLC reflects left-handed circularly polarized light. The filter works as follows. White light 2708 from the projection lamp enters from the left of the figure. The RH CLC coating is formulated to reflect right-handed circularly polarized light in all visible and infrared wavelengths 1410. Thus no right-handed circularly polarized light passes through the filter. Eliminating the IR portion of the spectrum helps to reduce heating in optical components farther down in the light path of the projector. To continue, left-handed CP light passes from the RH CLC coating through the glass substrate and falls on the LH CLC Coating. In this example, the LH CLC coating is formulated to reflect left-handed circularly polarized light in the green, blue, and IR wavelengths 2712. Thus only left-handed circularly polarized light in the red wavelengths passes completely through the filter 2714. The result is a red polarizing/color filter that also completely blocks IR radiation.

Figure 28:
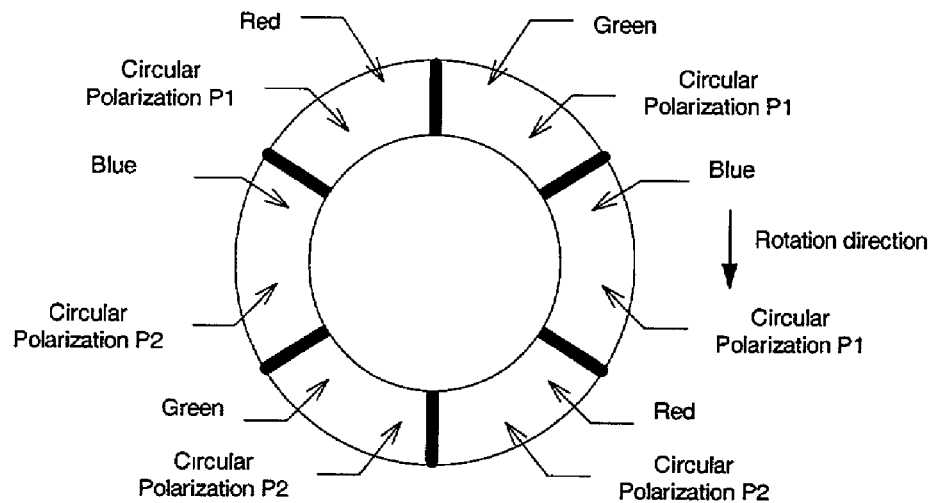
FIG. 28 illustrates a Six-Segment Color Wheel type CW-C

Other color filters (green, blue, and white) may be implemented by changing the formulation of the LH CLC Coating. FIG. 28 illustrates representative drawings of the spectral response of the CLC coatings used to realize a white polarizing filter. The top graph 2802 illustrates the percent reflection response for Filter A (RH CLC Coating). Filter A is used to reflect all RHCP light in the visible and IR wavelengths. The middle graph 2804 illustrates the percent reflection response for Filter B (LH CLC Coating). Since the

TABLE 6

3D Optical Configuration Table

Figure 38:
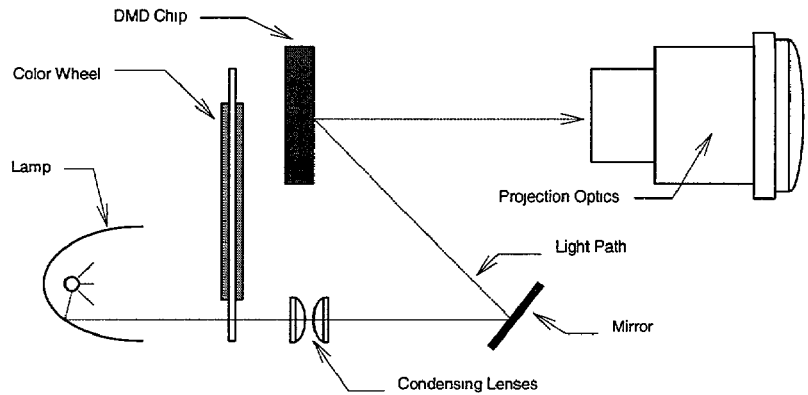
FIG. 38 illustrates a DMD based stereo 3D projector, 3D optical Configurations: A, B, H, I, K, M, N, S, U and W.
Figure 39:
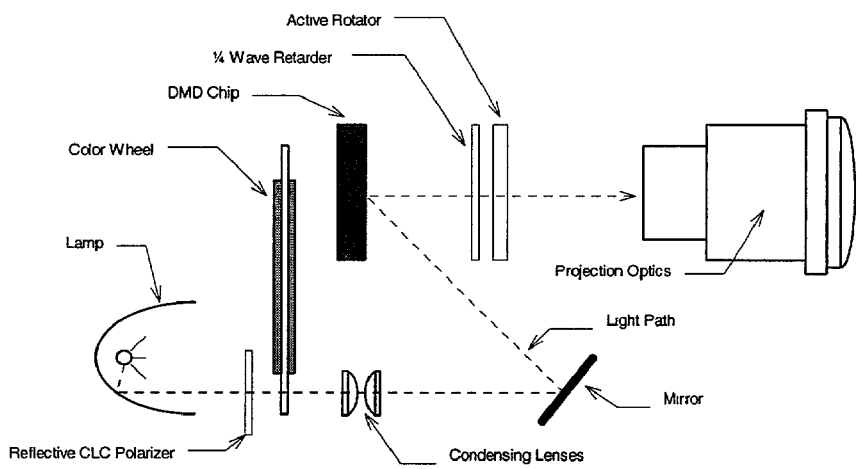
FIG. 39 illustrates a DMD based stereo 3D projector, 3D optical configurations: C and O.
Figure 40:
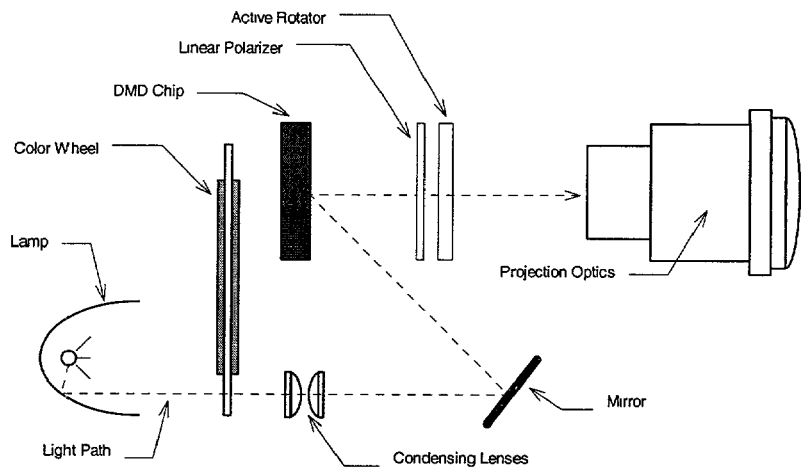
FIG. 40 illustrates a DMD based stereo 3D projector, 3D optical configurations: D and P.
Figure 41:
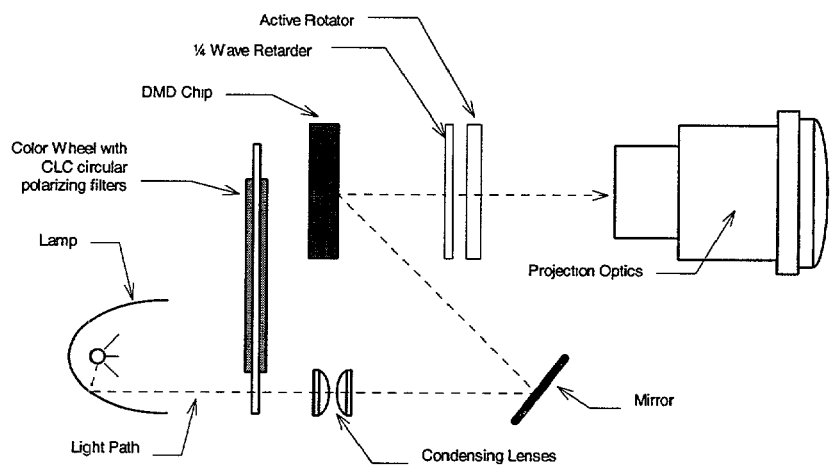
FIG. 41 illustrates a DMD based stereo 3D projector, 3D optical configurations: E and Q.
Figure 42:
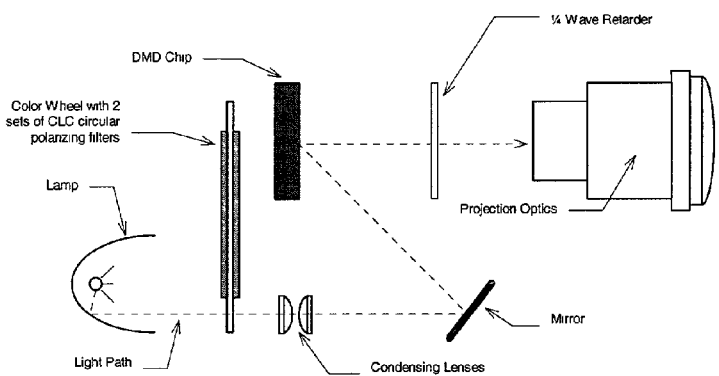
FIG. 42 illustrates a DMD based stereo 3D projector, 3D optical configurations: F, G, J, L, R, T and V.

| 3D Optical Config. | Color Wheel Type | CLC CPF[1] | ¼ Wave Plate | LPF[2] | Active Rotator | 3D Display Method | Decode Method[3] | FIGURE |
|---|---|---|---|---|---|---|---|---|
| A | CW-A | | | | | Frame | ASG | FIG. 38 |
| B | CW-A | | | | | Color | ACF | FIG. 38 |
| C | CW-A | X | X | | X | Frame | LPG | FIG. 39 |
| D | CW-A | | | X | X | Frame | LPG | FIG. 40 |
| E | CW-B | X | | | X | Frame | LPG | FIG. 41 |
| F | CW-C | X | | | | Frame | LPG | FIG. 42 |
| G | CW-C | X | | | | Color | LPG | FIG. 38 |
| H | CW-C | | | | | Frame | CPG | FIG. 38 |
| I | CW-C | | | | | Color | CPG | FIG. 38 |
| J | CW-D | X | | | | Color | LPG | FIG. 42 |
| K | CW-D | | | | | Color | CPG | FIG. 38 |
| L | CW-E | X | | | | Color | LPG | FIG. 42 |
| M | CW-E | | | | | Color | CPG | FIG. 38 |
| N | CW-F | | | | | Frame | ASG | FIG. 38 |
| O | CW-F | X | X | | X | Frame | LPG | FIG. 39 |
| P | CW-F | | | X | X | Frame | LPG | FIG. 40 |
| Q | CW-G | X | | | X | Frame | LPG | FIG. 41 |
| R | CW-H | X | | | | Frame | LPG | FIG. 42 |
| S | CW-H | | | | | Frame | CPG | FIG. 38 |
| T | CW-I | X | | | | Color | LPG | FIG. 42 |
| U | CW-I | | | | | Color | CPG | FIG. 38 |
| V | CW-J | X | | | | Color | LPG | FIG. 42 |
| W | CW-J | | | | | Color | CPG | FIG. 38 |

Figure 27:
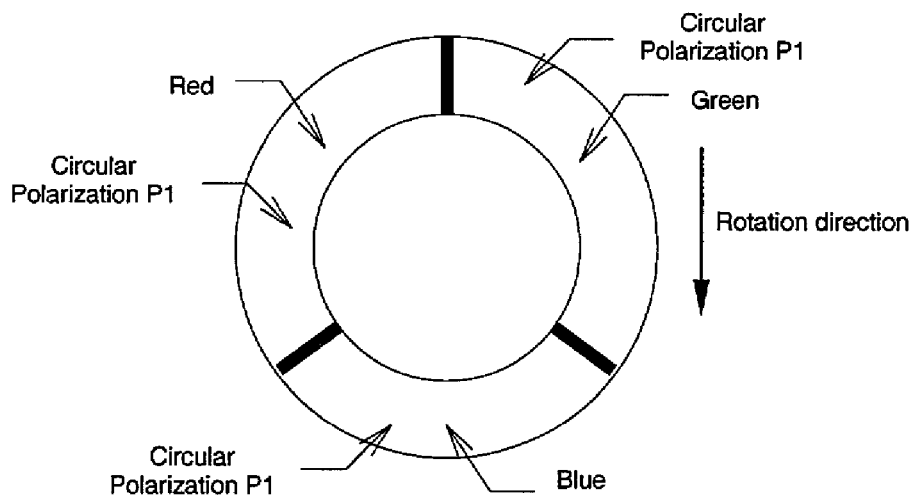
FIG. 27 illustrates a Three-Segment Color Wheel type CW-B.

[1]Cholesteric Liquid Crystal Circularly Polarizing Filter
[2]Linearly Polarizing Filter
[3]LPG = linearly polarized glasses, CPG = circularly polarized glasses, ASG = Active Shutter Glasses, ACF = Active Color Filter glasses CLC Circularly Polarizing Filter FIG. 27 illustrates an operational diagram of the CLC circularly polarizing color filter 2700 employed in the present invention. The filter consists of a glass substrate goal is to realize a white LHCP filter, only the IR portion of the spectrum is reflected. Finally, the bottom graph 2806 shows the percent transmission response for the entire filter assembly. The graph illustrates that filter assembly passes only red, green, and blue LHCP light. This technology is used both for the color wheel and for the stand-alone CLC polarizing filter components.

Color Wheel

The primary purpose of the color wheel is to aid in generating full color image output. As has been demonstrated by previous examples, there are many possible configurations for the color wheel. In many of these configurations the color wheel is used as both the means to generate full color images and to polarize the light output of the projector for polarization based 3D encoding methods. The CLC color filter technology presented above is used for all of the configurations requiring polarizing filters on the color wheel. There are a total of ten color wheel configurations listed in Table 7. FIG. 29 through 38 each illustrate a Color Wheel Type A through J. A graphical representation of each color wheel configuration is presented in the corresponding figure listed in the table. In the CLC Polarization Pattern column of the table, a letter R, G, or B is used to refer to the color output of the polarizing filter, and a number 1 or 2 used to refer to the polarization state of the light output (either right-handed or left-handed circular)

TABLE 7

Color Wheel Configuration Table

Figure 29:
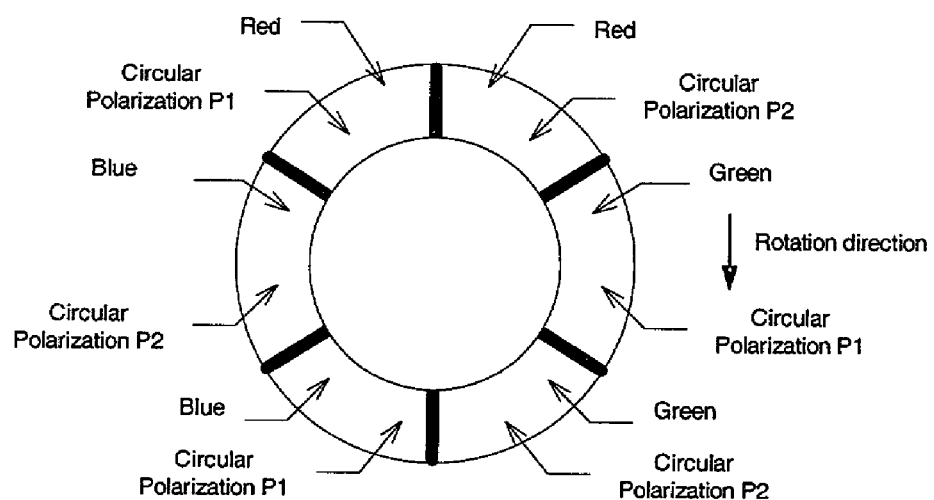
FIG. 29 illustrates a Six-Segment Color Wheel type CW-D.
Figure 30:
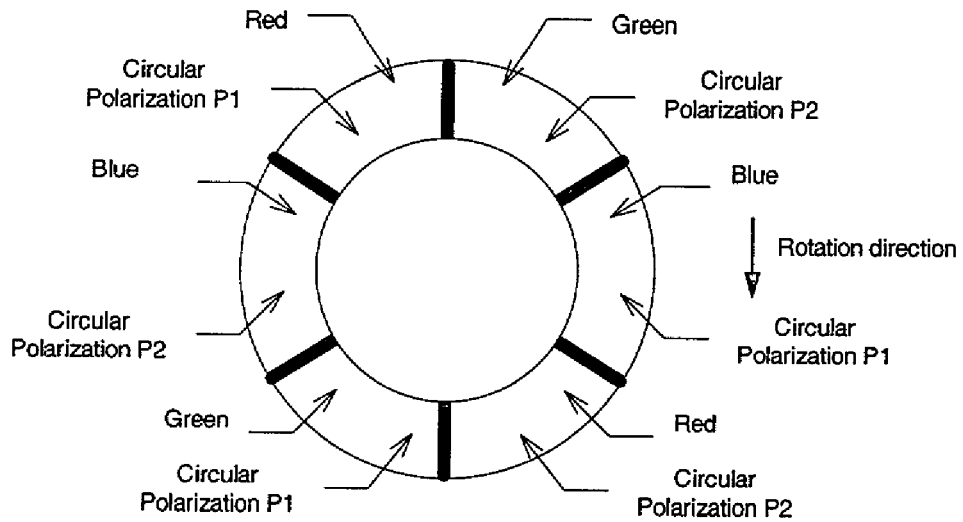
FIG. 30 illustrates a Six-Segment Color Wheel type CW-E.
Figure 31:
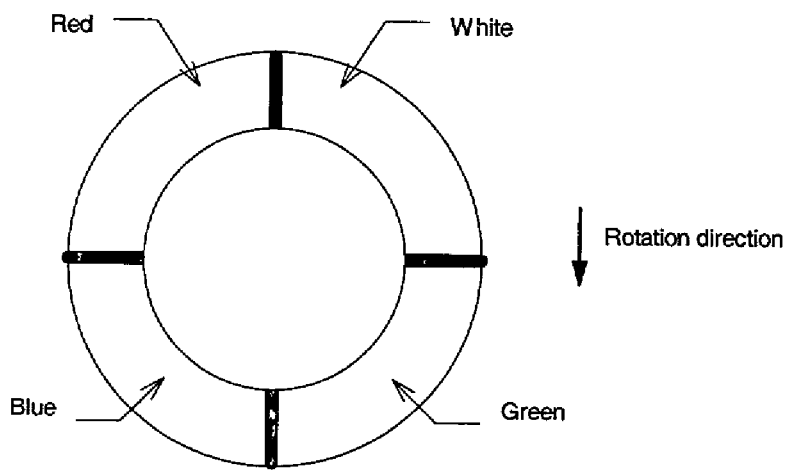
FIG. 31 illustrates a Four-Segment Color Wheel type CW-F.
Figure 32:
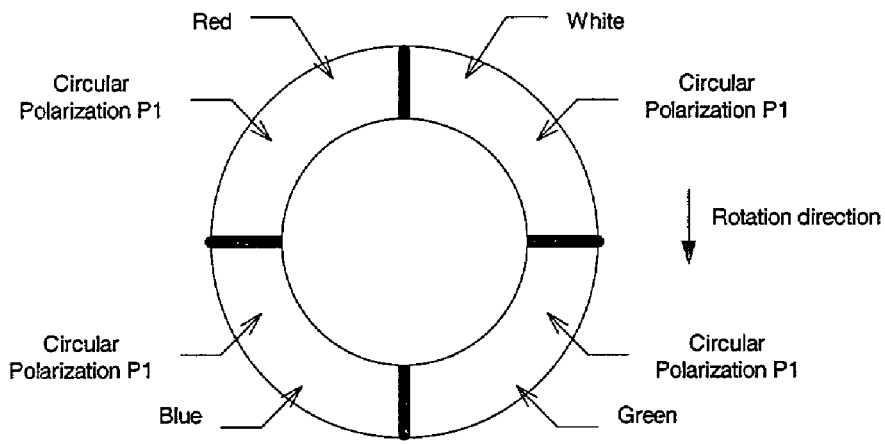
FIG. 32 illustrates a Four-Segment Color Wheel type CW-G.
Figure 33:
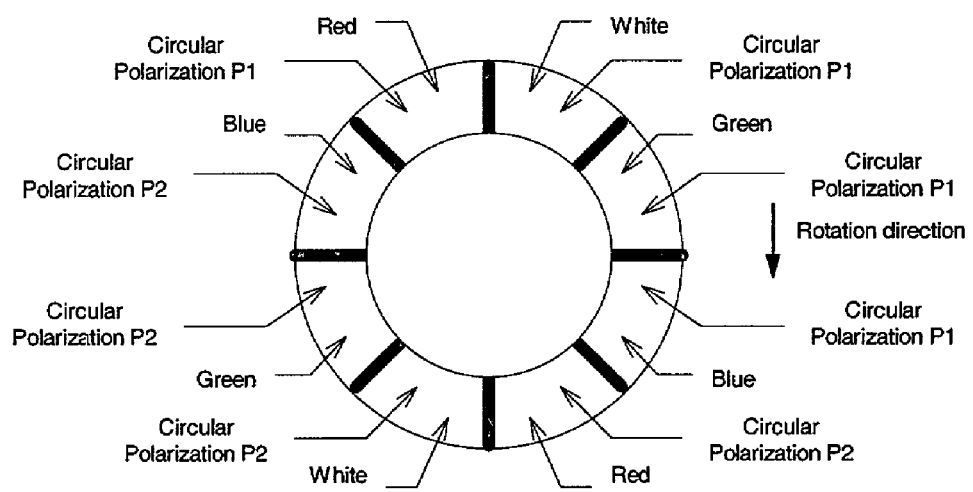
FIG. 33 illustrates a Eight-Segment Color Wheel type CW-H.
Figure 34:
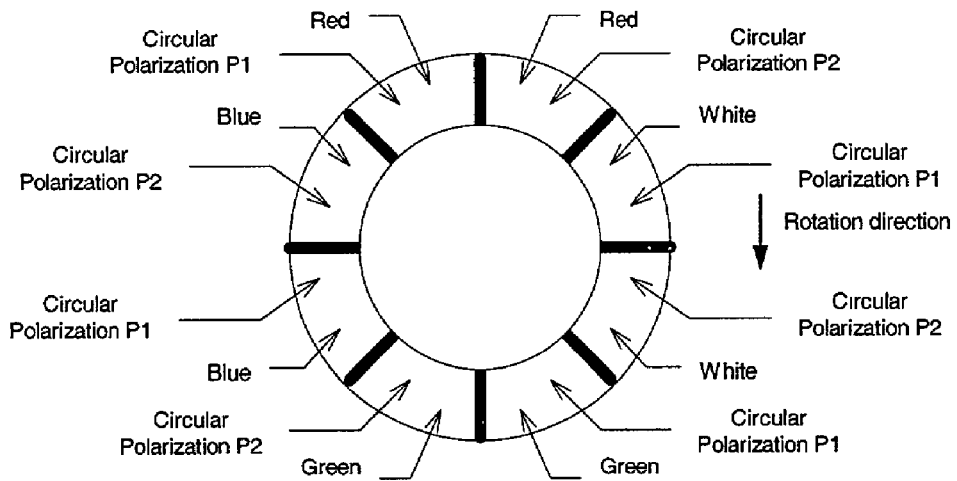
FIG. 34 illustrates a Eight-Segment Color Wheel type CW-I.
Figure 35:
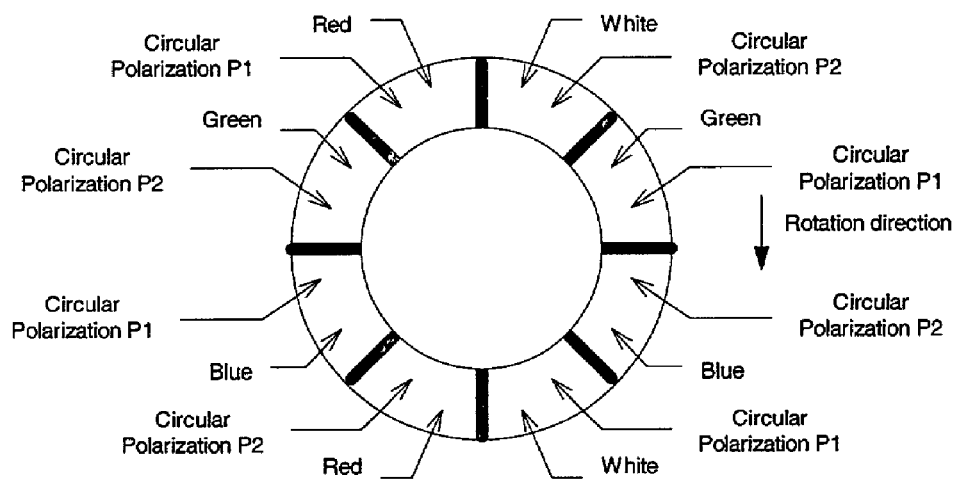
FIG. 35 illustrates a Eight-Segment Color Wheel type CW-J.
Figure 36:
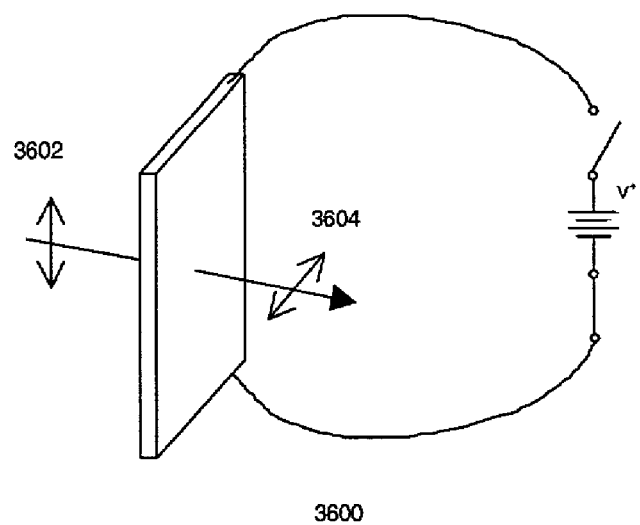
FIG. 36 illustrates a Liquid Crystal Rotator with no Applied Terminal Voltage.
Figure 37:
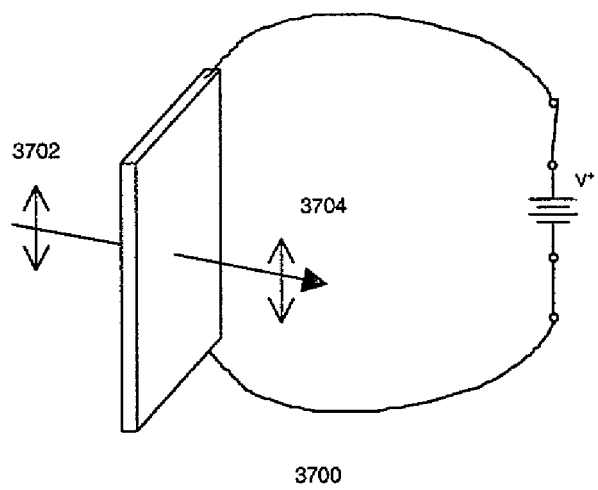
FIG. 37 illustrates a Liquid Crystal Rotator with no Applied Terminal Voltage.

| Color Wheel Type | Colors | CLC Polarization Pattern (P1 & P2) | Color Filters | Reference FIGURE |
|---|---|---|---|---|
| CW-A | RGB | None | 3 | FIG. 26 |
| CW-B | RGB | R1 G1 B1 | 3 | FIG. 27 |
| CW-C | RGB | R1 G1 B1 R2 G2 B2 | 6 | FIG. 28 |
| CW-D | RGB | R1 R2 G1 G2 B1 B2 | 6 | FIG. 29 |
| CW-E | RGB | R1 G2 B1 R2 G1 B2 | 6 | FIG. 30 |
| CW-F | RWGB | None | 4 | FIG. 31 |
| CW-G | RWGB | R1 W1 G1 B1 | 4 | FIG. 32 |
| CW-H | RWGB | R1 W1 G1 B1 R2 W2 G2 B2 | 8 | FIG. 33 |
| CW-I | RWGB | R1 R2 W1 W2 G1 G2 B1 B2 | 8 | FIG. 34 |
| CW-J | RWGB | R1 W2 G1 B2 W1 R2 B1 G2 | 8 | FIG. 35 |

¼-Wave Retarder

The ¼-wave retarder is a passive optical element that is used to convert circularly polarized light to linearly polarized light. It may appear at any of three 3D Optical Encoding Positions 1326, 1328, 1330 of FIG. 13.

Linearly Polarizing Filter

The linearly polarizing filter (LPF) is another passive optical element that is used to linearly polarize unpolarized light. The LPF is used in conjunction with the active rotator to optically encode left and right perspective images using linearly polarized light.

Active Liquid Crystal Rotator

The active liquid crystal rotator (ALCR) is used to switch the light output between to orthogonal linearly polarized states. FIG. 39 illustrates the operation of the ALCR in the OFF state 3900. In this case vertically polarized light 3902 enters from the left side of the figure and as converted to horizontally polarized light 2904 as it passes through the ALCR. In effect the FIG. 40 illustrates the operation of the ALCR in the ON state (electric field is applied) 4000. In this case the polarization angle of the input light 4002 is left unchanged 4004.

Optical Encoding System Configurations

A complete list of the feasible configurations A–W for 3D optical encoding using the five components listed above is presented in Table 6. The table also lists the figures. FIGS. 41 through 45 are associated with each configuration. The table indicates the color wheel type used, the usage of a separate CLC polarizer, the usage of a ¼-wave retarder, the usage of a linear polarizer, and the usage of an active rotator by the placement of an "X" in the appropriate column. The table also indicates the 3D Display method required for proper operation of the encoding method and finally refers to the 3D Decoding method required for proper stereo viewing.

3D Optical Decoding Methods

The final component category of the present invention is the 3D Optical Decoding system. This system optically decodes left and right perspective images for presentation to the observer. The system is physically located near the observer. In fact each of the four methods for implementation take the form of eyewear that is worn by the observer. Implementations other than eyewear may be realized depending on the situation and application. The four 3D Optical Decoding methods of the present invention include: passive linearly polarized glasses, passive circularly polarized glasses, active liquid crystal shutter glasses, and active color filter glasses. The choice of which method to use depends on the application and price-performance factors. For instance the least expensive method uses linearly polarized glasses and the most expensive method is the active color filter glasses. Active shutter glasses are likely to have the best performance while circularly polarized glasses are likely to have the worst performance. Each method is present in more detail below.

Passive Linearly and Circularly Polarized Glasses

Figure 46:
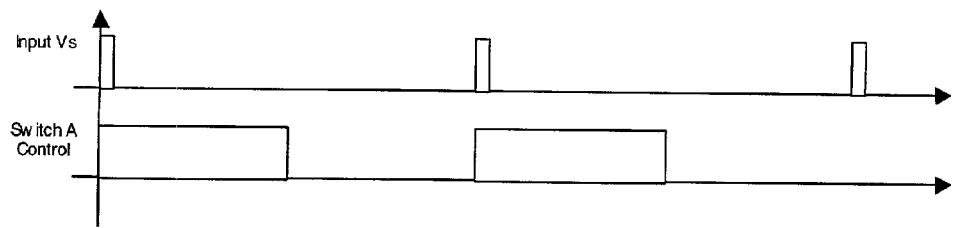
FIG. 46 illustrates a Switch A Control for "Over-Under" RGB 3D Format.

Passive polarized glasses 4600 consist of two polarizing filters, one for each eye, which block selected polarization states. One 4602 filter blocks light in the P1 polarization state and the other filter 4604 blocks light in the P2 polarization state as shown in FIG. 46. The figure holds for either linear or circular polarizing filters. 3D eyewear is ubiquitous in it usage with 3D projection systems.

Active Liquid Crystal Shutter Glasses

Figure 47:
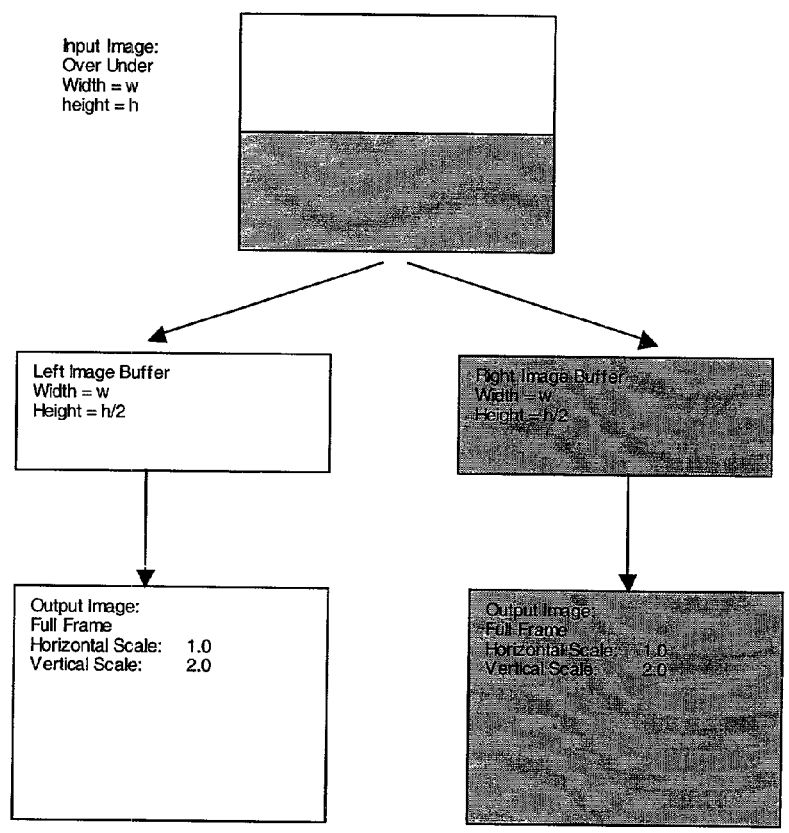
FIG. 47 illustrates an Output Scaling for Over-Under 3D Format Input.

The operation of a typical liquid crystal shutter 4700 is demonstrated in FIG. 47. Typical LC shutters employ an active liquid crystal element sandwiched between two crossed polarizers as shown in the figure. The first linear polarizer, labeled P1 4702, polarizes light entering the shutter from the left 4704. The active shutter element 3706 has two possible states. It either passes the polarized light without changing the polarization orientation or it rotates the polarization angle to that of the output polarizer P2. If the active element passes the light without changing the polarization state the output polarizer prevents light from exiting the shutter since its polarization angle is orthogonal to that of the light exiting the active element. However, if the active element switches the polarization angle of the light to that of the output, the output polarizer will allow the light to pass out of the shutter The use of liquid crystal shutter glasses 4800 for 3D stereoscopic viewing is demonstrated in FIG. 48. A sequence of images that alternate between the left and right view perspective is displayed on a viewing screen. Two shutters, which serve as the primary optical components of the shutter glasses, are opened and closed in such a way that left eye shutter is open only when the left eye image is displayed on the view screen and the right eye shutter is open only when the right eye image is displayed. When a shutter is closed ideally all light is blocked from passing through the shutter element as shown in the figure. When the shutter is opened, the shutter is transparent allowing the underlying eye to see the intended image. The figure illustrates the transition from the left eye view to the right eye view from left to right with the left eye cycle on the left of the figure and the right eye cycle on the right of the figure. In the figure time increases from left to right.

Active Color Filter Glasses

Active color filter glasses are very similar to active shutter glasses except that the second polarizer is replaced with a special polarization selective color filter. ColorLink, Inc. makes a color filter material that transmits green light when the input light is linearly polarized in the P1 state and transmits magenta light (the combination of red and blue) when the input is P2 linearly polarized. FIG. 39 illustrates a functional diagram for a single switchable color filter lens 4900. As in the shutter glass example above, unpolarized light 4902 on the left of FIG. 49 passes through polarizer P1. If the active LC cell is OFF the polarization angle is rotated by 90° to the P2 state. Since the polarized light is P2 polarized the color filter 4908 passes only the red and blue (magenta) wavelengths and blocks the green. When the LC cell 4906 is ON the output polarization state becomes P1 and the color filter passes green and blocks red and blue. Shutter glasses based on this color filter design use two filter assemblies with opposite states so that when one filter transmits green the other filter transmits magenta and vice versa.

Details on Row and Column Interleaving for a DLP Based 3D Stereoscopic Projection System Each embodiment relies on certain characteristics of a projector system. The projector system generally has two digital light processing chips on a formatter board. This formatter board takes the input video in places it into a format usable by the DMD device. Each control chip has 64 output lines. Each output line contains the data for micromirrors on 16 columns. These columns are not contiguous, but are either all even or all off numbered columns. Each column has 384 rows (in a 1024×768 chip having 786,432 mirrors) representing either the lower or upper half of the screen.

There are at least two methods for achieving stereoscopic (3D) viewing similar approach to line blanking methods previously used. The line blanking systems are disclosed in previous applications by the inventors including U.S. Pat. No. 6,456,432 issued Sep. 24, 2002 entitled "Stereoscopic 3-D Viewing System With Portable Electro-Optical Viewing Glasses and Shutter-State Control Signal Transmitter Having Multiple Modes of Operation for Stereoscopic Viewing of 3-D Images Displayed in Different", Ser. No. 10/110,265 filed on Oct. 5, 2000 (which is related to PCT/US00/27446) entitled "3D Shutter Glass and Line Blanker System", Ser. No. 09/269,990 filed on Apr. 22, 1999 entitled "Line Blanker System" and U.S. Pat. No. 5,821,989 issued on Oct. 13, 1998 entiled "Stereocoscopic 3-D Viewing System and Glasses Having Electrooptical Shutters Controlled by Control Signals Produced Using Horizontal Pulse Detection Within the Vertical Synchronization Pulse Period of Computer Generated Video Signals". All of these are hereby incorporated by reference.

As discussed above, the first of these is a column blanking or column switching technique. The basics of the system are:

a) display a "column interleaved" image in which a left and right eye view is displayed. Let the left perspective (left eye view) image be displayed on the even (odd) columns and the right perspective (right eye view) be displayed on the odd (even) columns;

b) alternatively "blank" out the left image columns by switching to electrical ground all signal lines corresponding to even (odd) columns; alternatively "blank out the right image columns by switching to electrical ground all signal lines corresponding to off (even) columns;

c) at the same time provide a signal to a pair of external shutter glasses to close the left eye shutter of the pair of shutter glasses or switch the state of an internal polarizing optical rotator to block light from entering the eye of a user wearing standard polarizing 3D glasses and at the same time provide a signal to the pair of external shutter glasses to close the right eye shutter of the pair of shutter glasses or switch the state of the internal polarizing optical rotator to block light from entering the of a user wearing standard passive 3D glasses;

d) simultaneously open the left eye shutter and close the right shutter or switch the internal polarizing rotator to a right blocking mode and simultaneously open shutter and close left eye shutter or switch the internal polarizing rotator to a left blocking mode.

A variation of the column-blanking embodiment is known as the column doubling method. The basics of the system are:

a) display a "column interleaved" image in which a left and right eye view is displayed. Let the left perspective (left eye view) image be displayed on the even (odd) columns and the right perspective (right eye view) be displayed on the odd (even) columns.

b) alternatively "blank" out the left image columns by switching to electrical ground all signal lines corresponding to even (odd) columns; alternatively "blank out the right image columns by switching to electrical ground all signal lines corresponding to off (even) columns;

c) at the same time provide a signal to a pair of external shutter glasses to close the left eye shutter of the pair of shutter glasses or switch the state of an internal polarizing optical rotator to block light from entering the eye of a user wearing standard polarizing 3D glasses and at the same time provide a signal to the pair of external shutter glasses to close the right eye shutter of the pair of shutter glasses or switch the state of the internal polarizing optical rotator to block light from entering the of a user wearing standard passive 3D glasses;

d) simultaneously open the left eye shutter and close the right shutter or switch the internal polarizing rotator to a right blocking mode and simultaneously open shutter and close left eye shutter or switch the internal polarizing rotator to a left blocking mode.

Data Former Block Diagram

Figure 43:
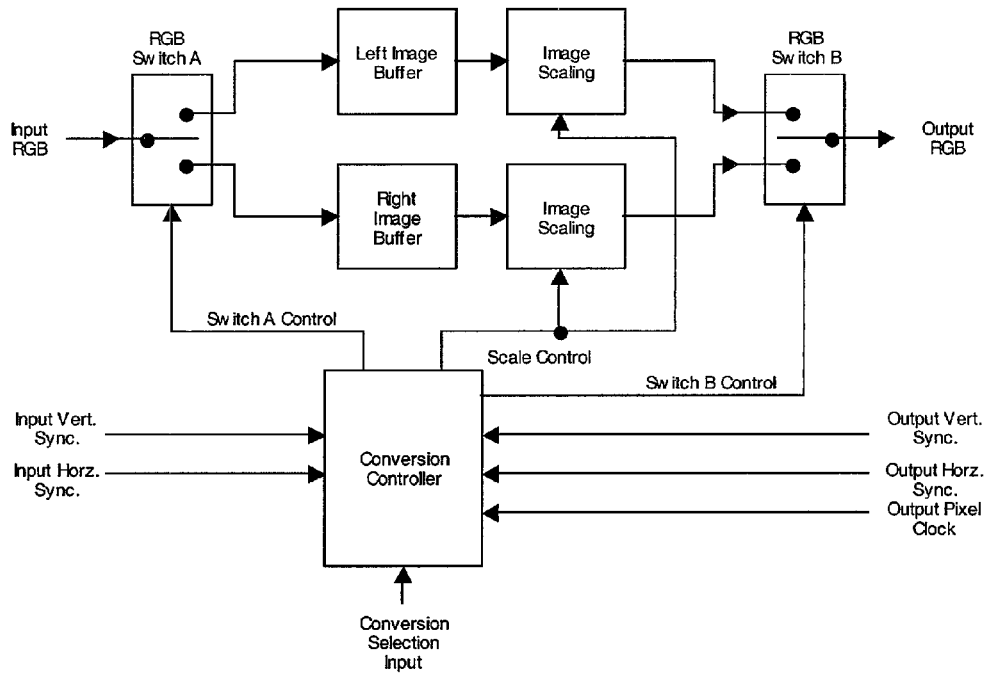
FIG. 43 illustrates a 3D Data Formatter Block Diagram.

FIG. 43 illustrates another block diagram of the 3D Data Formatter described in FIG. 14. The main purpose of the 3D Data Formatter is to convert the various possible 3D formats into column-interleaved 3D format. It also performs interpolation of the 3D image and scan conversion of the input signals. The 3D Data Formatter receives 24- or 48-bit RGB digital input and uses RGB Switch A to de-multiplex the 3D images encoded in the input signal. In other words, RGB Switch A is used to direct left image data to the Left Image buffer and right image data to the Right Image buffer. The way in which the switch operates depends on the method used to multiplex the 3D image. More details on the operation of the RGB Switch A is proved in the below.

The fact that RGB Switch A separates the left and right image data means that interpolation (scaling) can be performed on each image separately. Traditional interpolation methods used in prior art non-stereoscopic projectors and video systems mix data from both images and thereby ruin the stereoscopic effect. Therefore traditional interpolation methods are not suitable for 3D systems.

Both the Left Image Buffer and Right Image Buffer are dual port memories that allow simultaneous reading and writing of image data. This feature allows the implementation of the scan conversion function. Scan conversion is used to either increase or decrease the frame rate of video signals. In the preferred embodiment the output scan rate for the 3D Data Formatter is 60 Hz.

As shown in the figure separate Image Scaling blocks follow the Left and Right Image Buffers and provide a means to interpolate the left and right images separately without mixing data. Image data must be interpolated from the input resolution that may be 640×480, 800×600, 1024×768, 1280×1024 or any other resolution, to the native resolution of the DMD display. In the preferred embodiment, the Image Scaling blocks are used to interpolate image data to 1024 pixels wide by 768 pixels high.

The RGB Switch B is used to re-multiplex 3D image information into output RGB digital signal in the column interleaved format. This transformation is accomplished by switching between the left and right image channels at the pixel clock rate.

The Conversion Controller manages and controls the image data processing in both left and right image channels and controls both the RGB digital switches. The Conversion Controller receives synchronization signals from both the input and the output image busses and uses these signals in the 3D Format conversion and scan conversion processes. The Conversion Selection Input is used to communicate to the Conversion Controller the 3D Format of the input signals. The Conversion Controller uses this information to modify operation of RGB Switch A to de-multiplex the various possible 3D formats including field-sequential, frame-sequential (page flipped), row-interleaved, over-under, side-by-side, and column interleaved.

Switch A Control for "Row-Interleaved" RGB 3D Format

Figure 44:
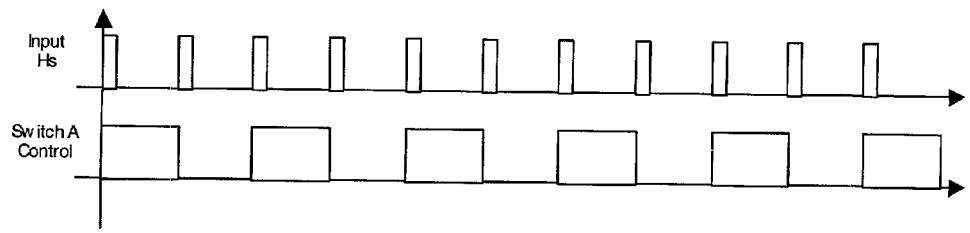
FIG. 44 illustarates a Switch A Control for Row-Interleaved RGB Input.

FIG. 44 illustrates a diagram of the RGB Switch A control waveform used to de-multiplex row-interleaved 3D image data. In this case the switch state is changed on the rising edge of the input horizontal synchronization signal. The switch control is reset at the beginning of each frame so that the each row is consistently switched to the same image channel every frame.

Output Scaling for Row-Interleaved Format Input

Figure 45:
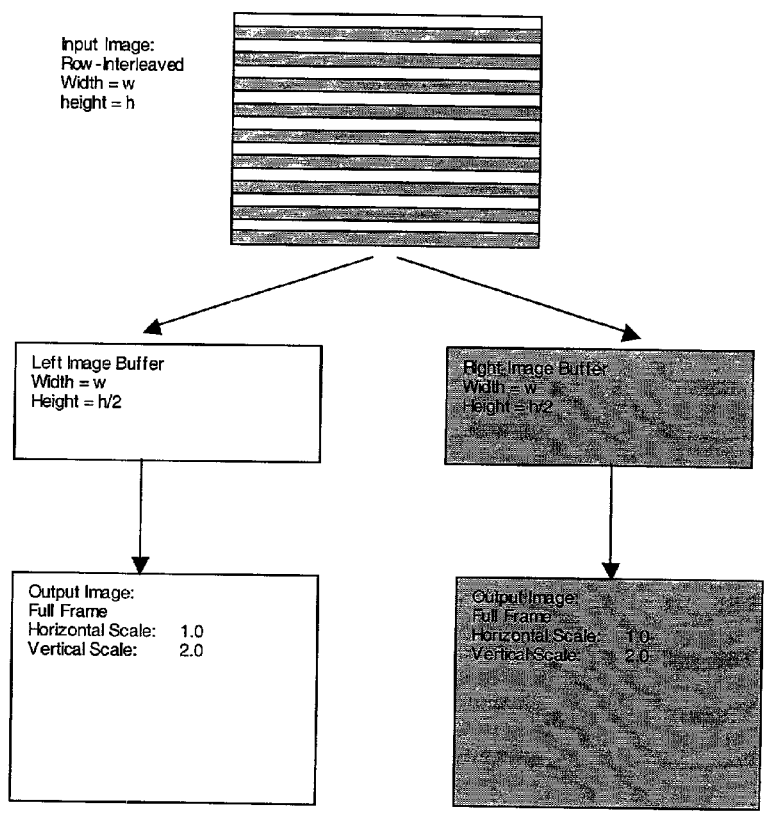
FIG. 45 illustrates an Output Scaling for Row-Interleaved 3D Format Input.

FIG. 45 illustrates a diagram depicting the operation of the input de-multiplexer and interpolation functions used for row-interleaved 3D input. In this case even rows (white) are switched to the left image buffer and odd rows (gray) are switched to the right image buffer. Since the resulting images in each image buffer are half height (half of the original image's vertical resolution), the interpolation block must double the vertical resolution of each buffered image. This is true for the case in which the input resolution is the same as the desired output resolution (1024×768 in the preferred embodiment). If the input resolution is different from the desired output resolution then the scale factors are computed as $$S_h = \frac{w_o}{w_i}, S_v = \frac{2h_o}{h_i},$$

where $S_h$ is the horizontal scale factor, $w_o$ is the width of the desired output image, $w_i$ is the width of the input image, $S_V$ is the vertical scale factor, $h_o$ is the height of the desired output image, and $h_i$ is the height of the original input image.

Switch A Control for "over-under" RGB 3D Input

FIG. 46 illustrates a diagram of the RGB Switch A control waveform used to de-multiplex over-under 3D image data. In this case the switch state is switched to one channel on the rising edge of each input vertical synchronization signal and set to the other channel at the midway point between vertical synchronization pulses. The switch control is reset at the beginning of each frame so that the top and bottom halves of each image are consistently switched to the same image channel every frame. The switch transition that occurs between vertical synchronization pulses is also synchronized to the input horizontal synchronization signal.

Output Scaling for "over-under" 3D Format Input

FIG. 47 illustrates a diagram depicting the operation of the input de-multiplexer and interpolation functions used for over-under 3D input. In this case the top half of the screen (white) is switched to the left image buffer and the bottom half of the screen (gray) is switched to the right image buffer. Since the resulting images in each image buffer are half height (half of the original image's vertical resolution), the interpolation block must double the vertical resolution of each buffered image. This is true for the case in which the input resolution is the same as the desired output resolution (1024×768 in the preferred embodiment). If the input resolution is different from the desired output resolution then the scale factors are computed as $$S_h = \frac{w_o}{w_i}, S_v = \frac{2h_o}{h_i},$$

where $S_h$ is the horizontal scale factor, $w_o$ is the width of the desired output image, $w_i$ is the width of the input image, $S_V$ is the vertical scale factor, $h_o$ is the height of the desired output image, and $h_i$ is the height of the original input image.

Switch A Control for "Page Flipped" RGB 3D Input

Figure 48:
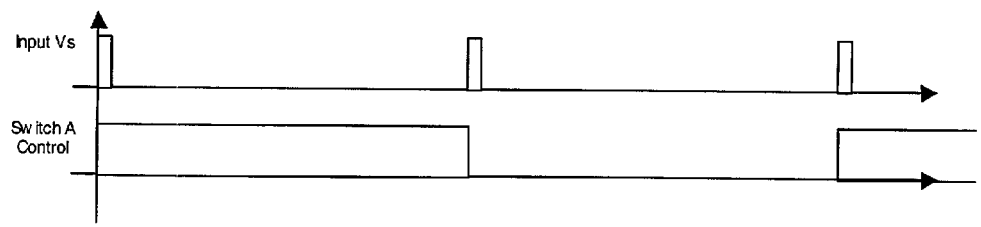
FIG. 48 Illustrates a Switch A Control for "Page-Flipped" 3D Input.

FIG. 48 illustrates a diagram of the RGB Switch A control waveform used to de-multiplex page-flipped 3D image data. In this case the switch state is on the rising edge of each input vertical synchronization signal. This causes the input signal to alternate between left and right image channels on a frame-by-frame basis.

Output Scaling for "Page-Flipped" 3D Format Input

Figure 49:
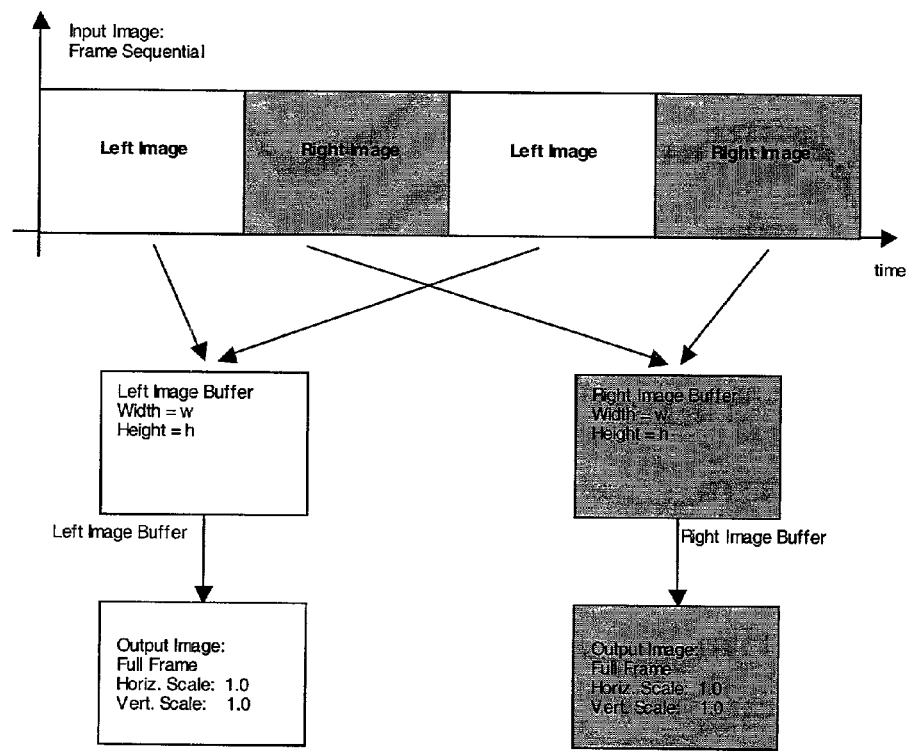
FIG. 49 illustrates an Output Scaling for "Page-Flipped" 3D Format Input.

FIG. 49 illustrates a diagram depicting the operation of the input de-multiplexer and interpolation functions used for page flipped 3D input. In this case odd numbered frames (white) are switched to the left image buffer and even numbered frames (gray) are switched to the right image buffer. Since the resulting images in each image buffer are full height the interpolation block need to apply any interpolation to the buffered image. This is true for the case in which the input resolution is the same as the desired output resolution (1024×768 in the preferred embodiment). If the input resolution is different from the desired output resolution then the scale factors are computed as $$S_h = \frac{w_o}{w_i}, S_v = \frac{h_o}{h_i},$$

where $S_h$ is the horizontal scale factor, $w_o$ is the width of the desired output image, $w_i$ is the width of the input image, $S_v$ is the vertical scale factor, $h_o$ is the height of the desired output image, and $h_i$ is the height of the original input image.

Switch A Control for "Side-by-Side" RGB 3D Input

Figure 50:
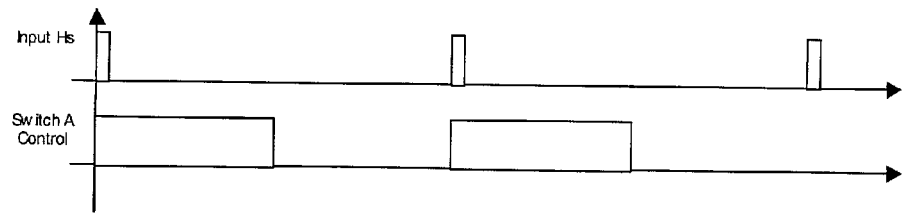
FIG. 50 Illustrates a Switch A Control for "Side-by-Side" RGB 3D Input.

FIG. 50 illustrates a diagram of the RGB Switch A control waveform used to de-multiplex side-by-side 3D image data. In this case the switch state is switched to one channel on the rising edge of each input horizontal synchronization signal and set to the other channel at the midway point between horizontal synchronization pulses. The switch control is reset at the beginning of each frame so that the left and right halves of each image are consistently switched to the same image channel every frame. The switch transition that occurs between horizontal synchronization pulses is also synchronized to the input pixel clock to ensure a smooth transition of data in the middle of a frame.

Output Scaling for Side-by-Side 3D Format Input

Figure 51:
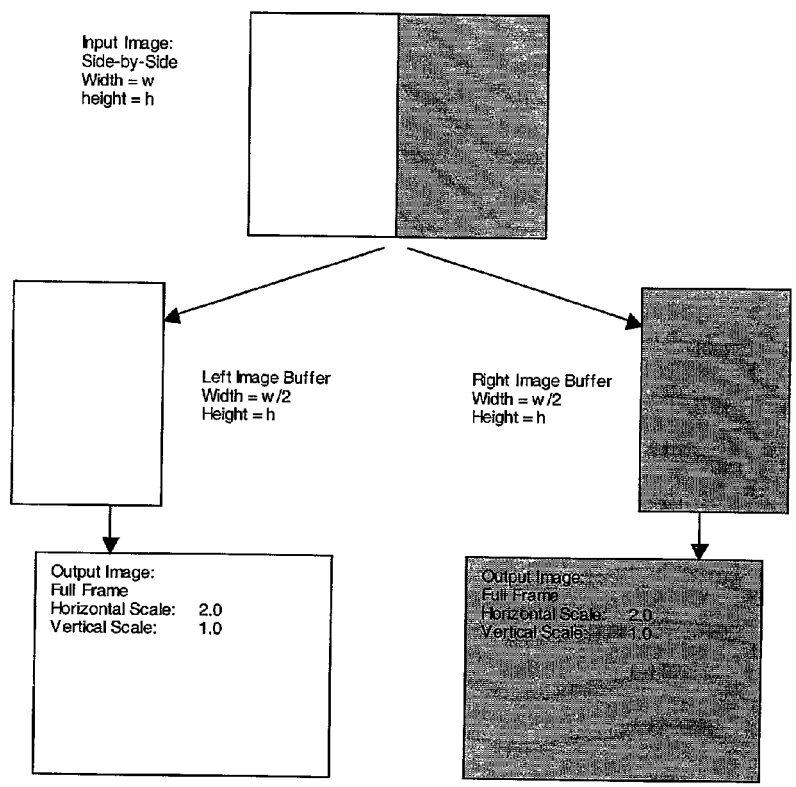
FIG. 51 illustraates an Output Image Scaling for Side-by-Side 3D Format Input.

FIG. 51 illustrates a diagram depicting the operation of the input de-multiplexer and interpolation functions used for side-by-side 3D input. In this case the left half of the screen (white) is switched to the left image buffer and the right half of the screen (gray) is switched to the right image buffer. Since the resulting images in each image buffer are half width (half of the original image's horizontal resolution), the interpolation block must double the horizontal resolution of each buffered image. This is true for the case in which the input resolution is the same as the desired output resolution (1024×768 in the preferred embodiment). If the input resolution is different from the desired output resolution then the scale factors are computed as $$S_h = \frac{2w_o}{w_i}, S_v = \frac{h_o}{h_i},$$

where $S_h$ is the horizontal scale factor, $w_o$ is the width of the desired output image, $w_i$ is the width of the input image, $S_v$ is the vertical scale factor, $h_o$ is the height of the desired output image, and $h_i$ is the height of the original input image.

Switch B Control; for 3D Data Formatter Block

Figure 52:
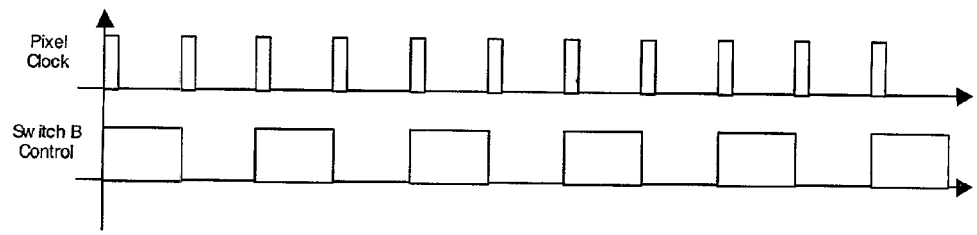
FIG. 52. illustartae a Switch B Control for 3D Data Formatter Block.

FIG. 52 illustrates the RGB Switch B control signal used to output 3D images data in the column-interleaved format. In this case the Switch B state is changed on the rising edge of the output pixel clock. This action causes left and right image data to be encoded on alternating columns of the output image. The Switch B control is reset at the beginning of each frame to make sure that left and right image data are consistently encoded to the proper columns.

Graphical Illustration of 3D Data Formatter Output

Figure 53:
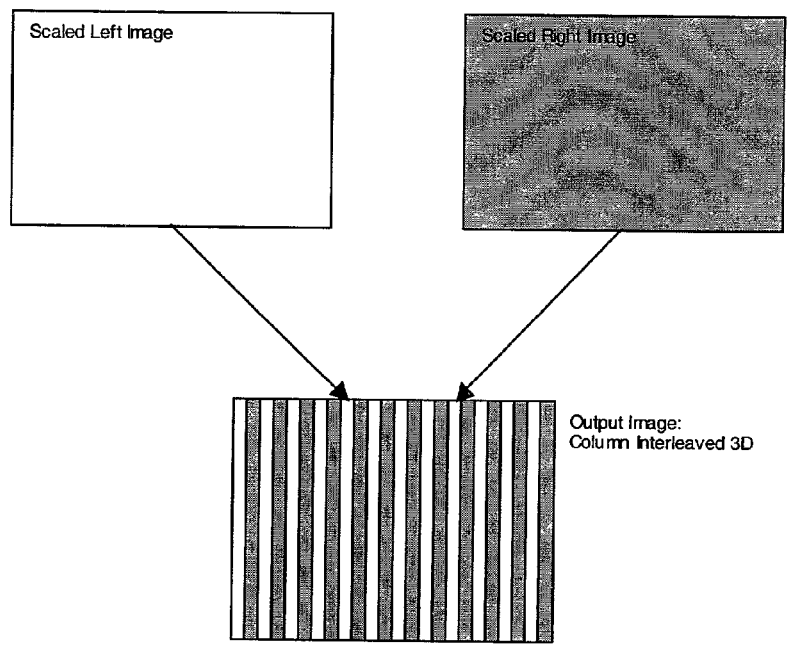
FIG. 53 illustrates a Graphical Illustration of 3D Data Formatter Output.

FIG. 53 illustrates a graphical representation of how the output of the 3D Data Formatter is produced. In the figure Left image data (white) is mapped to even columns and right image data (gray) is mapped to odd columns. In practice this order may be reversed if desired.

Display Formatter (DMD Data Formater)

Figure 54:
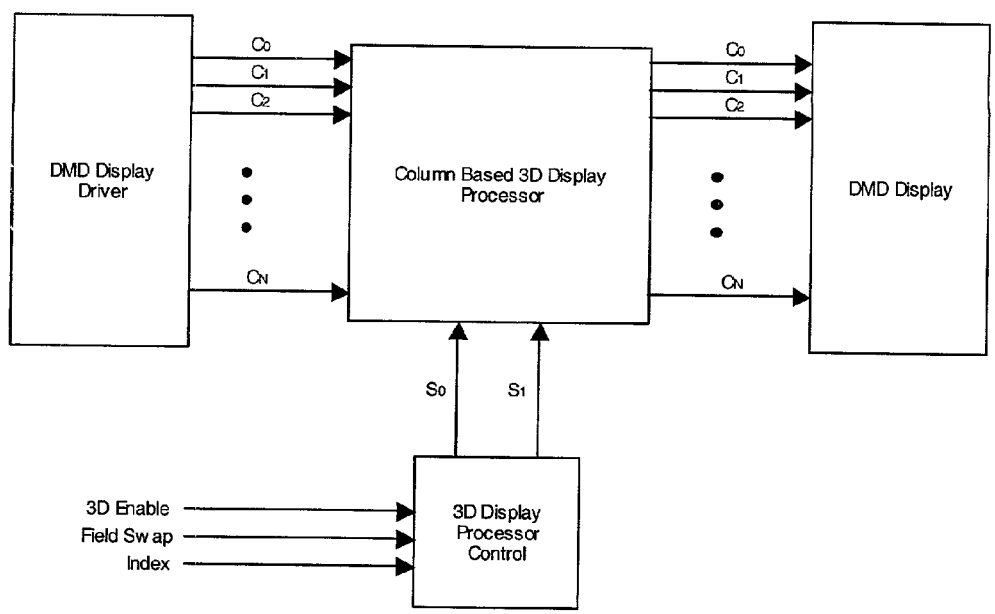
FIG. 54 illustrates a 3D Display Formatter.

FIG. 54 illustrates a block diagram representation of the 3D Display Formatter. The DMD Display Driver converts 24-bit RGB digital image data into column-wise control signals for the bi-stable micro-mirror devices that make up the display. This conversion is represented in the figure by the data lines $C_0, C_1, C_2, \ldots, C_N$. Theoretically, each data line $C_1$ may represent a single column of data on the display or an entire group of columns. One method in current use is to format the column data such that each $C_i$ represents 16 consecutive columns on the screen. Another method formats each $C_i$ to represent a set of 16 even or odd half columns (columns that are either located exclusively in the top or bottom half of the screen). A DMD Display Driver method required by the present invention involves the formatting of column data into alternate columns. That is each $C_i$ controls only even numbered or odd numbered columns on the display. For instance, the method used by the preferred embodiment formats data into odd or even half columns. In this case C0 would control columns 0, 2, 4, 6, 8, . . . , 30 on the top half of the screen. Similarly C1 would control columns 1, 3, 5, . . . , 31 on the top half of the screen. Other formats meeting the alternate column requirement are also possible. The result of the alternate column data format is that 24-bit RGB image data, in which the left (or right) image is encoded on odd columns and the right (or left) image is encoded on even columns, is transformed such that the left (or right) image appears only on odd column data lines $C_1, C_3, \ldots$, and the right (of left) image appears only on even column data lines $C_0, C_2, \ldots$.

The purpose of the 3D Display Formatter is to modify the column data output from the DMD Display Driver such that during a predefined left image time period, only the left image is displayed by the DMD Display, and during a predefined right image time period, only the right image is displayed by the DMD Display. Decoding of the column-wise data output from the DMD Display driver into left and right image data for input the DMD display is accomplished by the Column Based 3D Display Processor. A 3D Display Processor Control block is used to control the operation of 3D display and has the ability to switch between 2D display, 3D image display, and 3D with field swap display. The ability to swap left and right images is used correct the situation where the left eye of the observer sees the right image and vice-versa. The Index input to the 3D Display Processor Control is used to synchronize display of the left and right images the the 3Decoder Method (e.g., shutter glasses, active rotator, etc.).

Table 8 shows thetruth table used by the preferred embodiment to control the Column Based 3D Display Processor. Other truth tables may be used based on alternate invention.

TABLE 8

Truth Table for 3D Display Processor Control System

| 3D Enable | Field Swap | Index | S0 | S1 |
|---|---|---|---|---|
| 0 | 0 | 0 | 0 | 0 |
| 0 | 0 | 1 | 0 | 0 |
| 0 | 0 | 0 | 0 | 0 |
| 0 | 1 | 0 | 0 | 0 |
| 0 | 1 | 1 | 0 | 0 |
| 1 | 0 | 0 | 0 | 1 |
| 1 | 0 | 1 | 1 | 0 |

TABLE 8-continued

Truth Table for 3D Display Processor Control System

| 3D Enable | Field Swap | Index | S0 | S1 |
|---|---|---|---|---|
| 1 | 1 | 0 | 1 | 0 |
| 1 | 1 | 1 | 0 | 1 |

Finally, it should be noted that the beauty of the present invention is that it is independent of the number of DMD display chips that are used in the projection system. Therefore the present invention applies for all single chip, dual chip, and three chip DMD systems for which the alternate column data format (discussed previously) is used.

Block Diagram for 3D Display Processor using a Column Blanking Method

Figure 55:
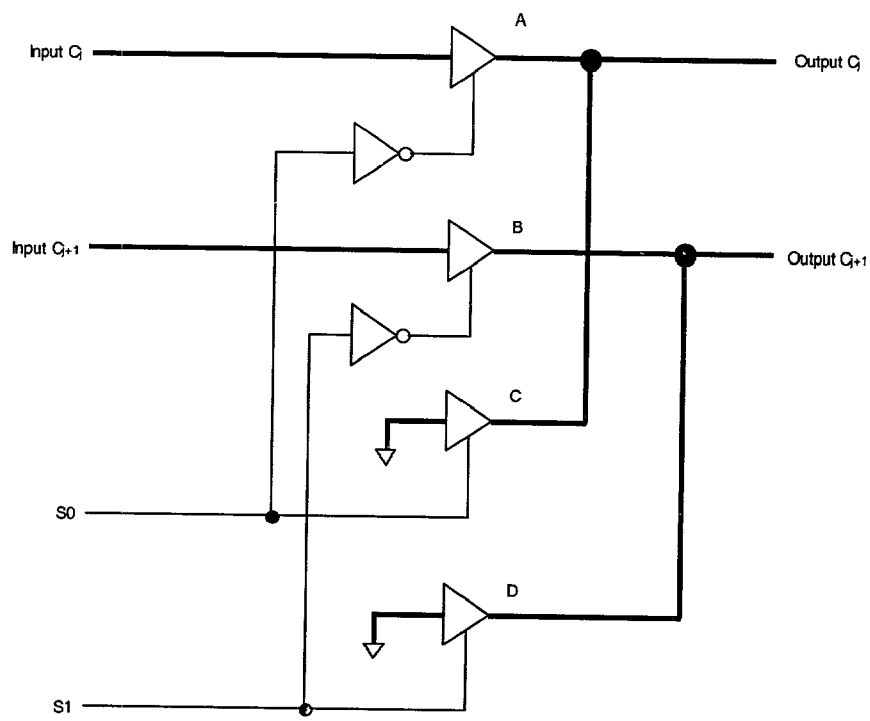
FIG. 55 illustrates a Block Diagram for 3D Display Processor Using Column Blanking Method.

FIG. 55 illustrates one possible method to realize the Column Based 3D Display Procesor known as Column Blanking. In this case four tri-state buffers are used to switch betweeb column-wise image data and "black". In the figure, $C_i$ represents a column or group of columns that transmit left image data. and $C_{i+1}$ represents a column or group of columns that transmit right image data. When both S0 and S1 are at logic 0, buffers A and B are in active mode and buffers C and D are in tri-state mode. Thus when both S0 and S1 are low, both sets of columns are displayed the system is considered to be in 2D mode. When S0 is low but S1 is high, the left image data on $C_i$ passes through the buffer. However this time, buffer B is in tri-state mode and buffer D is in pass-through mode. Therefore only the left image data reaches the display. Likewise when S0 is high and S1 is low, only the right image data reaches the display. Finally when both S0 and S1 are high odd and even columns are displayed in swapped positions that produce an undesirable 2D mode. Table 8 tabulates the truth table for this system.

Block Diagram for 3D Display Processor Using a Column Doubling Method

Figure 56:
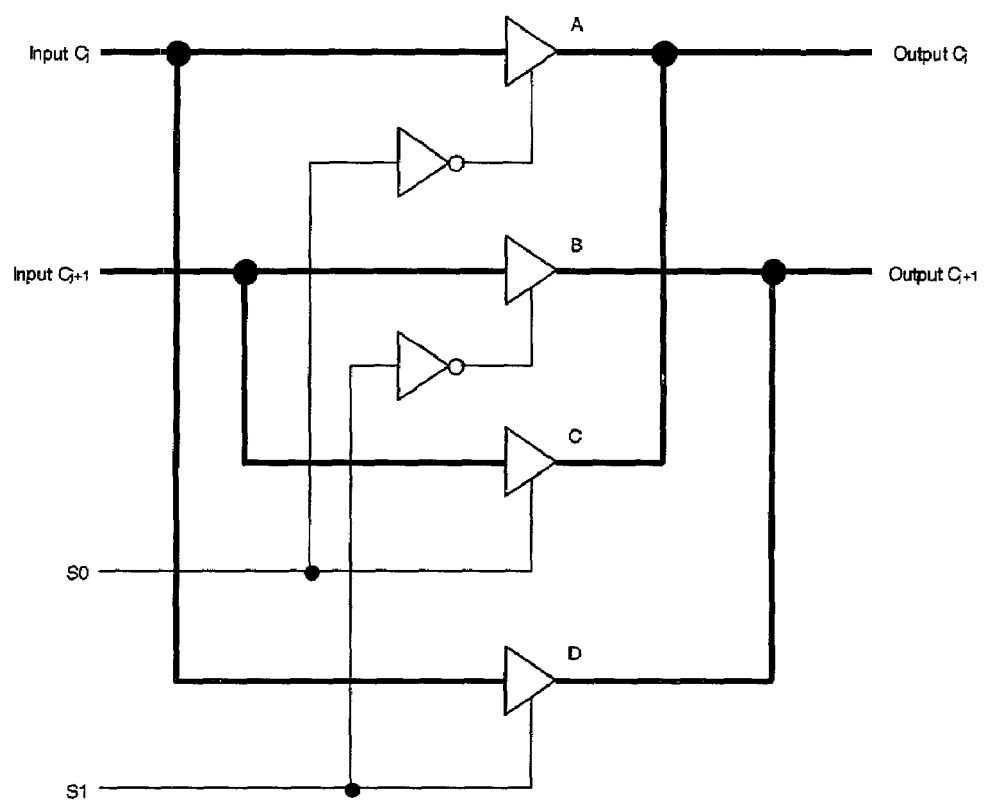
FIG. 56 illustrates a Block Diagram for a 3D Display Processor Using Column Doubling Method.
Figure 57:
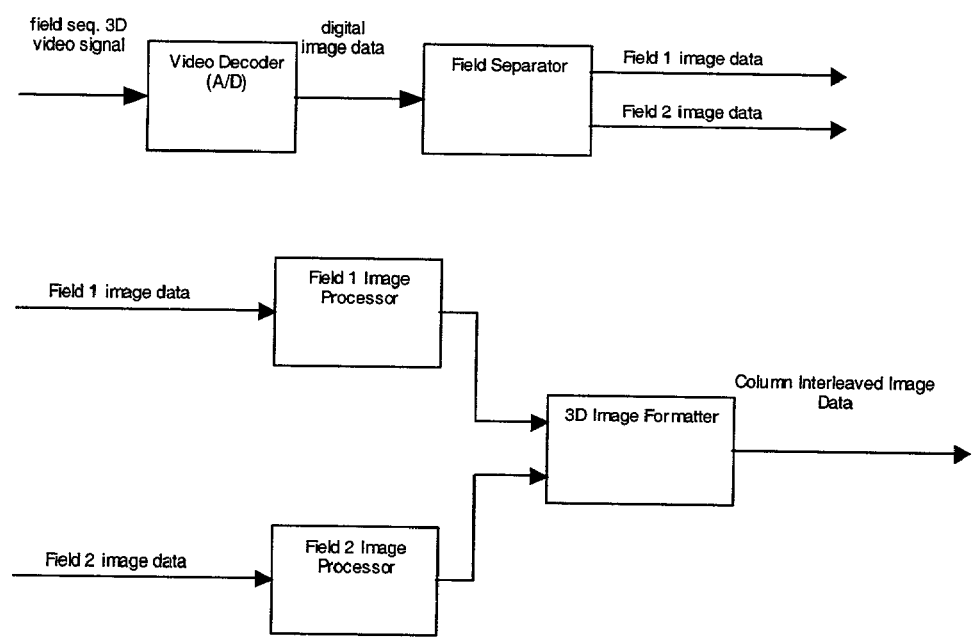
FIG. 57 illustrates a field sequebtial system.

FIG. 56 illustrates an alternative method for the 3D Display Processor called Column Doubling. This is the method used by the preferred embodiment of the present invention. In this method instead of blanking right image data during the left image time period and then blanking left image data during the right image time period, the image data from either right or left image is copied onto adjacent columns during the appropriate time period. For example, during the left image time period, left image data from even columns is routed to both even and odd columns of the DMD display. This has the effect of doubling the width of each left image data column. Likewise during the right image time period, the right image is transmitted to the DMD display on both odd and even columns. The advantage of this method over the column blanking method is that the image is twice as bright and there are now visible black columns in the image.

Using the same truth table as the column blanking method, when $S_0$ and $S_1$ are both low buffers C and D are in the tri-state mode and buffers A and B pass left and right data respectively to the DMD Display. When $S_0$ is low and $S_1$ is high, buffers B and C are in tri-state while buffers A and D are ON. This causes the left image data, transmitted by the $C_i$ input to be routed to both the $C_i$ and $C_{i+1}$ outputs. When S0 is high and S1 is low, buffers B and C are ON while A and B are in tri-state mode. In this state it is the right image data, transmitted by the $C_{i+1}$ input that is routed to both outputs. As in the previous case, when both S0 and S1 are high, odd and even rows are swapped in an undesirable 2D mode.

TABLE 9

Truth Table for 3D Display Processor

| S0 | S1 | $C_j$ | $C_{j+1}$ | Meaning |
|---|---|---|---|---|
| 0 | 0 | $C_j$ | $C_{j+1}$ | Normal 2D Output |
| 0 | 1 | $C_j$ | $C_j$ | Left Image Output |
| 1 | 0 | $C_{j+1}$ | $C_{j+1}$ | Right Image Output |
| 1 | 1 | $C_{j+1}$ | $C_j$ | illegal output |

Conversion of Field Sequential 3D Video Data to Column Interleaved Progressive Data.

In order for a properly formatted 3D stereoscopic image to be displayed on a DLP projector using the column blanking or column doubling method, left and right perspective images must be combined and displayed in a column interleaved format. That is, composite image data set, consisting of both left and a right image data must be formatted such that right image data exists only on even numbered columns and left image data exists only on odd numbered columns (or vice versa).

The system in the FIG. $56_{13}$ depicts one method for converting field sequential 3D video images (such as NTSC or PAL 3D video) into progressive column interleaved 3D images for display on the projection system. Starting at the top of the diagram, field sequential video, in which the right perspective image is encoded on field 1 and the left perspective image is encoded on field two (or vice versa) is decoded and converted to a digital signal. Next a field separator extracts field 1 image data to a first data channel and field 2 image data to a second data channel. Field 1 and Field 2 image data are separately processed and scaled to the native resolution of the projector display system. Finally a 3D image formatter recombines the processed field data and formats these data such that processed field 1 data is encoded on even (or odd) columns of the display and processed field 2 data is encoded on odd (or even) columns of the display.

Conversion from 2D to 3D

A method of converting a digital micro-mirror device based 2D projection system to a digital micro-mirror device based 3 D projection system includes installing a 3D data formater; installing a digital micro mirror device data formatter; optionally replacing an existing color wheel with a color wheel formatted for 3D; and installing 3D optical encoder system in one of three positions in an optical path of said system.

The 3D data formater includes a 4:2 RGB Input Data Switch/router coupled to two video processors each coupled to a memory system; a microcontroller coupled to said 4:2 RGB input data switch/router, to said video processors and to a 2:2 RGB output data switch router and an output of each video processor coupled to said 2:2 RGB output data switch router.

The digital micro-mirror device data formatter includes a dual port memory controller coupled to a memory, a digital micro-mirror data converter and a microcontroller; the digital micro-mirror data converter provides output digital micro-mirror device data; and the microcontroller provides control signals to said dual-port memory controller, the digital memory device data converter and a color wheel controller as well as 3D field signal.

The optional color wheel includes: 1) a three segment color wheel comprising a red; green; and blue filter wherein said filters are placed in a rotation direction of said wheel; 2) a three segment wheel further comprising a red circular polarization filter; a green circular polarization filter; and a blue circular polarization filter; 3) a six segment wheel further comprising a red circular polarization filter with a first polarization state; a green circular polarization filter with a first polarization state; a blue circular polarization filter with a first polarization state and a blue circular polarization filter; a red circular polarization filter with a second polarization state; a green circular polarization filter with a second polarization state; and a blue circular polarization filter with a second polarization state, wherein said filters are placed in a rotation direction of said wheel; 4) a six segment wheel further comprising a red circular polarization filter with a first polarization state; a red circular polarization filter with a second polarization state; a green circular polarization filter with a first polarization state; a green circular polarization filter with a second polarization state; a blue circular polarization filter with a first polarization state; and a blue circular polarization filter with a second polarization state, wherein said filters are placed in a rotation direction of said wheel; 5) a six segment wheel further having a red circular polarization filter with a first polarization state; a green circular polarization filter having a second polarization state; a blue circular polarization filter having a first polarization state; a red circular polarization filter having a second polarization state; a green circular polarization filter having a first polarization state; and a blue circular polarization filter having a second polarization state, wherein said filters are placed in a rotation direction of said wheel; 6) a four segment color wheel having a red filter; a white filter; a green filter; and a blue filter, wherein said filters are placed in a rotation direction of said wheel; 7) a four segment wheel further having a first red circular polarization filter having a first polarization state; a first white circular polarization filter; a first green circular polarization filter; a first blue circular polarization filter, wherein all filters have a same polarization state and are positioned in a rotation direction of said wheel. 8) an eight segment wheel further comprising a first red circular polarization filter having a first polarization state; a first white circular polarization filter having a first polarization state; a first green circular polarization filter having a first polarization state; a first blue circular polarization filter having a first polarization state; a second red circular polarization filter having a second polarization state; a second white circular polarization filter having a second polarization state; a second green circular polarization filter having a second polarization state; a second blue circular polarization filter having a second polarization state, wherein said filters are positioned in a rotation direction of said wheel; 9) an eight segment wheel further comprising a first red circular polarization filter having a first polarization state; a second red circular polarization filter having a second polarization state; a first white circular polarization filter having a first polarization state; a second white circular polarization filter having a second polarization state; a first green circular polarization filter having a first polarization state; a second green circular polarization filter having a second polarization state; a first blue circular polarization filter having a first polarization state; a second blue circular polarization filter having a second polarization state, wherein said filters are placed in a rotation direction of said wheel; 10) an eight segment wheel further comprising a first red circular polarization filter having a first polarization state; a first white circular polarization filter having a second polarization state; a first green circular polarization filter having a first polarization state; a first white circular polarization filter having a first polarization state; a second white circular polarization filter having a first polarization state; a second red circular polarization filter having a second polarization state; a second blue circular polarization filter having a first polarization state; a second green circular polarization filter having a second polarization state, wherein said filters are placed in a rotation direction of said wheel.

A method of converting a 4 color wheel system into a 3 color wheel system includes in addtion to the above blocking the light output during the white transition of the 4 color wheel. Methods for blocking include mechanical occlusion of the white filter on the color wheel, the use of an internal or external LC shutter system that is synchronized to block light during the white filter output, the use of an internal or external mechanical shutter that is synchronized to block light during the white filter output.

The implementations of 3D systems into DMD projection systems as illustrated are merely exemplary. It is understood that other implementations will readily occur to persons with ordinary skill in the art. All such implantations and variations are deemed to be within the scope and spirit of the present invention as defined by the accompanying claims

What is claimed is:

1. A digital micro-mirror device (DMD) format conversion system for outputting a stereoscopic encoded optical signal in a format readable within a display system employing a DMD and a color wheel, said DMD format conversion system comprising:

a 3D data formatter for receiving an input signal having stereoscopic image information with an input frame rate and generates an output signal comprising stereoscopic image infbrmation and control information having a self synchronized output frame rate independent of and decoupled from the input frame rate;

a DMD data formatter for receiving the output signal having stereoscopic image information and control information from the 3D data formatter and for outputting a DMD output signal having stereoscopic image information and control information, wherein the DMD output signal having stereoscopic image information and control information, including a color wheel control signal indicative of rotation rate and output digital micro-minor device data indicative of micro-mirror switching rates, wherein said color wheel control signal and output digital micro-mirror device date are synchronized based on the output frame rate generated by the 3D data formatter;

said digital micro-mirror device data formatter including a dual port memory controller that converts the output signal having stereoscopic image information and control information from the 3D data formatter, with a full color image format, at the output frame rate into an image stream having serial individual color images synchronized to the color wheel control signal based on the output frame rate a memory device;

a DMD data converter for formatting from die image stream into output DMD data readable by a digital micro-mirror chip; and a micro-controller for controlling the dual port memory controller based on the 3D format.

2. The DMD format conversion system as in claim 1, wherein said self synchronized output frame rate is set or selected to reduce appearance of flicker.

3. The DMD format conversion system as in claim 1, wherein the output signal of the 3D data formatter is color sequential stereoscopic data.

4. The DMD format conversion system as in claim 1, wherein the output signal of the 3D data formatter is flame sequential stereoscopic data.

5. A DMD projection system comprising:

the DMD format conversion system as in claim 1;

an illumination source including a lamp for transmitting light to condensing optics, light from said condensing optics being transmitted to a rotating color wheel, the rotating color wheel coupled to the DMD data formatter for receiving color wheel control signals indicative of rotation rate synchronized based on the output frame rate generated by the 3D data formatter;

a digital micro-mirror chip for receiving the output DMD data and reflecting, from micro-mirrors of the digital micro-mirror chip, light received from said color wheel; and projection optics for projecting light reflected from said digital micro-mirror chip.

6. The DMD projection system as in claim 5, wherein said color wheel includes a 3D encoder system synchronized based on the output frame rate generated by the 3D data formatter.

7. A stereoscopic viewing system comprising the DMD projection system as in claim 6 and an optical decoder for allowing a viewer to perceive stereoscopic images.

8. The stereoscopic viewing system as in claim 7, wherein the optical decoder comprises passive polarizing lenses having one polarization state corresponding to one eye and another polarization state corresponding to another eye.

9. The stereoscopic viewing system as in claim 7, wherein the optical decoder comprises active shutter glasses.

* * * * *